United States Patent [19]
Miyauchi et al.

[11] Patent Number: 5,554,976
[45] Date of Patent: Sep. 10, 1996

[54] METHOD AND APPARATUS FOR DETECTING ABNORMALITY IN GAS SUPPLY EQUIPMENT

[75] Inventors: Shinji Miyauchi, Nara-ken; Shinichi Nakane, Yamatokoriyama; Kazutaka Asano, Nara-ken; Yoshio Horiike, Katano; Makoto Tsuboi, Nara, all of Japan

[73] Assignee: Matsushita Electric Industrial Co., Ltd., Osaka-fu, Japan

[21] Appl. No.: 131,613

[22] Filed: Oct. 5, 1993

[30] Foreign Application Priority Data

| Oct. 5, 1992 | [JP] | Japan | 4-265843 |
| Oct. 5, 1992 | [JP] | Japan | 4-265844 |
| Dec. 10, 1992 | [JP] | Japan | 4-330235 |
| Dec. 14, 1992 | [JP] | Japan | 4-332624 |
| Dec. 14, 1992 | [JP] | Japan | 4-332625 |
| Dec. 18, 1992 | [JP] | Japan | 4-338413 |

[51] Int. Cl.6 ................................. G08B 21/00
[52] U.S. Cl. ............ 340/626; 340/605; 340/606; 340/611; 340/632; 73/40.5 R; 73/861.19; 137/557
[58] Field of Search ............... 340/605, 606, 340/611, 626, 632; 73/196, 861.19, 40.5 R; 137/557

[56] References Cited

U.S. PATENT DOCUMENTS

| 4,269,061 | 5/1981 | Hatsuno et al. | 340/626 |
| 4,797,666 | 1/1989 | Baxter et al. | 340/626 |
| 4,915,613 | 4/1990 | Landis et al. | 431/6 |
| 5,057,822 | 10/1991 | Hoffman | 340/611 |
| 5,261,268 | 11/1993 | Namba | 340/605 |

FOREIGN PATENT DOCUMENTS

| 503925A1 | 11/1992 | European Pat. Off. |
| 2-201509 | 8/1990 | Japan |
| 4-076312 | 3/1992 | Japan |

*Primary Examiner*—John K. Peng
*Assistant Examiner*—Daniel J. Wu
*Attorney, Agent, or Firm*—Wenderoth, Lind & Ponack

[57] ABSTRACT

An abnormality detecting apparatus constantly monitors even a slight amount of gas which has leaked by checking a gas supply pipe when it is determined that the pressure regulating function of a pressure regulator is abnormal. The abnormality detecting apparatus detects an abnormality of the regulated pressure of a pressure regulator appropriately by comparing the regulated pressure with a predetermined low value of a pressure regulating range when the gas flow rate is high and with a predetermined high value of a pressure regulating range when the gas flow rate is low.

8 Claims, 19 Drawing Sheets

METHOD AND APPARATUS FOR DETECTING ABNORMALITY IN GAS SUPPLY EQUIPMENT

BACKGROUND OF THE INVENTION

1. Filed of the Invention

The present invention relates to an apparatus for detecting an abnormality of a pressure regulator for regulating, to an appropriate pressure, the pressure of liquified propane gas accommodated in a gas bottle or a gas supplied in bulk and supplied to a gas instrument under a high pressure or for detecting a gas leakage which has occurred in a gas supply pipe and a method to be carried out by the apparatus.

2. Description of the Related Arts

A gas meter incorporating a gas cutoff device has been developed in recent years in order to prevent an explosion due to gas leakage or a fire which occurs due to a failure in turning off the gas. The gas cutoff device has a function of stopping a gas supply when a signal indicating the occurrence of gas leakage has been detected. If it is decided by the gas cutoff device that the gas has been in use for a long time and thus the gas has not been turned off, the gas cutoff device stops the supply of gas. Owing to this cutoff operation, gas leakage or an abnormal pressure can be prevented from occurring in the range downstream of the gas meter, namely, on the gas instrument side of a gas supply equipment.

Inspections for safety control of the side upstream of the gas meter, namely, the range between a gas bottle and the gas meter is performed by an employee of a propane gas supplier who goes to the gas supply equipment once every two years.

FIG. 1 is a block diagram showing the construction of a conventional gas supply equipment to be checked for safety. The gas supply equipment comprises a gas bottle 1 containing liquefied propane gas 1, a cock 2, a pressure regulator 3, a gas meter 4, a gas burning instrument or combustor 5, a pressure gauge 6, and a pen recorder 7 for recording the change in gas pressure.

The safety check operation of the gas supply equipment of this construction is performed as follows. An operator visits the gas supply equipment once every two years where the operator interposes the pressure gauge 6 and the pen recorder 7 between the pressure regulator 3 and the gas meter 4 so that the pen recorder 7 records a gas pressure inside the gas pipe. In order to check for the leakage of gas between the pressure regulator 3 and the gas meter 4, the operator closes a cutoff valve incorporated in the gas meter 4 and the cock 2 of the gas bottle 1. If gas leakage has occurred, the pen recorder 7 records a gas pressure which has dropped with the passage of time. In this manner, an abnormal state of the gas pipe can be checked. The pressure adjusting capability of the pressure regulator 3 is checked by the following method. The operator opens the cock 2 and a cutoff valve disposed inside the gas meter 4 to cause the gas burning instrument 5 to be used in a normal condition so that a gas pressure is measured by the pressure gauge 6. If a gas pressure ranges from 2300 to 3300 Pascal (Pa), it is decided that the pressure regulator 3 has a normal pressure adjusting capability, whereas if a gas pressure is not in this range, it is decided that the pressure regulator 3 has an abnormal pressure adjusting capability.

It takes time and labor for the operator to visit the gas supply equipment so as to perform safety check by installing measuring devices on the gas supply equipment. In addition, the operator goes to the gas supply equipment at an interval of two years, which is long in ensuring the safety of the gas supply equipment.

In order to solve this problem, abnormality detecting apparatuses have been developed and disclosed in Japanese Laid-Open Patent Publications No. 4-76312 and 2-201509. The apparatuses were developed to monitor gas leakage which may occur in a gas supply pipe or abnormality of a gas pressure regulator constantly or frequently.

The apparatus according to Japanese Laid-Open Patent Publication No. 4-76312 comprises a pressure detecting means for detecting a gas pressure in a gas supply pipe downstream of a pressure regulator serving as a gas supply equipment; a timer means controlled by a signal outputted from the pressure detecting means; a deciding means for deciding whether or not the gas supply equipment has an abnormality on receipt of a signal outputted from the timer means; and an alarm giving means for outputting an alarm signal on receipt of a signal outputted from the deciding means.

FIG. 2 is a block diagram showing the abnormality detecting apparatus according to Japanese Laid-Open Patent Publications No. 4-76312. The apparatus comprises a gas bottle containing liquefied propane gas 1, a cock 2, a pressure regulator 3, and a gas meter 4 accommodating a pressure sensor 8 serving as a pressure detector; a timer means 9; a deciding unit 10; an alarm generator 11; and a gas burning instrument or combustor 5.

When the pressure regulating function of the pressure regulator 3 operates normally, a gas pressure in the gas supply equipment is kept in the range from 2300 to 3300 Pa when gas is used by the gas burning instrument 5. But when the gas burning instrument 5 is not used, the temperature of LP gas enclosed inside the gas pipe rises even though the pressure regulator 3 is normal. This is because the gas supply equipment is subjected to sunshine. As a result, the pressure of gas pressure rises due to the expansion thereof. Consequently, the gas pressure may exceed 3300 Pa. Therefore, it is necessary to decide whether the pressure rise has occurred due to the abnormality of the pressure regulator 3 or due to temperature rise in outside temperature. In the apparatus having the above-described construction, a decision as to the pressure regulator 3 is normal or not is made by utilizing the characteristic of pressure that a pressure change is comparatively slow in the case of pressure rise due to temperature rise and a pressure which has risen to a certain value in several minutes is kept for more than 24 hours. That is, when a signal indicating that the cutoff pressure of the pressure regulator 3 exceeds 3300 Pa and the cutoff pressure is greater than 3300 Pa for as long as 24 hours as a result of turn-off of the gas burning instrument 5, it is decided that the gas pressure inside the pressure regulator 3 is abnormal. When the gas pressure of the pressure regulator 3 is less than 3300 Pa as a result of turn-off of the gas burning instrument 5, the timer means 9 starts counting time and the deciding unit 10 monitors signals outputted from the timer means 9 and the pressure sensor 8. If a pressure indicated by signals outputted from the pressure sensor 8 is less than 3300 Pa for 30 days continuously, the deciding unit 10 decides that gas leakage has occurred, thus outputting a signal to the alarm generator 11. That is, the abnormality detecting apparatus detects an abnormality by utilizing the actual condition in that in 30 days, there is a day in which the gas instrument is not turned on and the gas pressure inside the gas pipe may rise due to a sunshine-caused temperature rise.

In the pressure regulating/measuring apparatus according to Japanese Patent Laid-Open Publication No. 2-201509, the pressure regulator and gas meter are constructed together as a unit. The apparatus comprises a means for generating a flow rate signal, a lower limit pressure detecting means, and an upper limit pressure detecting means. Turn-on and turn-off of the gas are detected by the means for generating a flow rate signal; a supply gas pressure is checked by signals outputted from the lower limit pressure detecting means and the upper limit pressure detecting means; a cutoff pressure is checked by the upper limit pressure detecting means; and gas leakage is detected by the means for generating a flow rate signal.

That is, the lower limit pressure detecting means and the upper limit pressure detecting means are constituted by a lead switch operated by a magnet installed on a diaphragm which is mounted in a pressure regulating portion and moved at a predetermined pressure or by a pressure switch of the semiconductor type. In this construction, when gas is being supplied, the pressure fluctuation cycle is 4–15 times per minute. If the pressure fluctuation cycle exceeds an upper limit of 4200 Pa 4–15 times per minute, it is decided that abnormality has not occurred in the pressure regulator. If the pressure fluctuation cycle does not exceed the upper limit 4200 Pa, it is decided that an abnormality has occurred in the pressure regulator.

In the above-described two conventional apparatuses, if the cutoff pressure adjusting capability of the pressure regulator is abnormal, only the abnormality of the cutoff pressure can be detected, whereas the apparatuses are not provided with techniques for checking the gas leakage of the gas pipe. Accordingly, even if it is decided that the cutoff pressure is abnormal, there are cases where the pressure regulator is not repaired or replaced promptly on the assumption that the abnormality of the cutoff pressure will not lead to an explosion or a fire soon. But in this case, there is a possibility that an explosion will occur.

In addition, the pressure adjusting capability of the pressure regulator which converts gas having a high pressure supplied from a gas bottle into gas having an appropriate combustible pressure range decreases gradually with the passage of time. It is preferable that the pressure adjusting capability of the pressure regulator can be kept to be constant. But in fact, the pressure adjusting capability of the pressure regulator decreases when the pressure regulator has a great flow rate of gas and in addition, the older the pressure regulator becomes, the lower the pressure adjusting capability becomes. Therefore, it is necessary to decide whether or not gas pressure is adjusted to a predetermined range in the state in which gas flow rate is more than a certain value.

SUMMARY OF THE INVENTION

It is an object of the present invention to provide a abnormality detecting apparatus capable of constantly monitoring even a slight amount of gas which has leaked by checking a gas supply pipe when it is detected that the pressure regulating function of a pressure regulator is abnormal.

It is another object of the present invention to provide a abnormality detecting apparatus capable of detecting an abnormality of the regulated pressure of a pressure regulator appropriately by comparing the regulated pressure with a predetermined low value of a pressure regulating range when gas the flow rate is great and with a predetermined high value of a pressure regulating range when the gas flow rate is small.

In accomplishing these and other objects, there is provided an abnormality detecting apparatus comprising: a pressure sensor, disposed downstream of a gas pressure regulator, for detecting a gas pressure of a gas supply equipment; flow rate detector, said flow rate detector detecting a flow rate of gas flowing through the gas supply equipment; a first timer which operates on receipt of a signal outputted from the flow rate detector when the gas is turned off; a cutoff pressure memory, said cutoff pressure memory storing a signal outputted form the pressure sensor; a cutoff pressure normality/abnormality deciding unit, said deciding unit comparing a pressure stored in the cutoff pressure memory with a predetermined first pressure based on a signal outputted from the first timer; a gas pressure comparator, said gas pressure comparator comparing the value of a signal outputted from the pressure sensor with a cutoff pressure reference value stored on said cutoff pressure memory based on a signal outputted from the first timer if the cutoff pressure normality/abnormality deciding unit decides that a cutoff pressure is abnormal; and an alarm generator, said alarm generator outputting a signal indicating abnormality alarm, abnormality information, abnormality indication, and/or cutoff of a gas passage on receipt of a signal outputted from the gas pressure comparator.

BRIEF DESCRIPTION OF THE DRAWINGS

These and other objects and features of the present invention will become clear from the following description taken in conjunction with the preferred embodiments thereof with reference to the accompanying drawings.

DETAILED DESCRIPTION OF THE INVENTION

Figure 1:
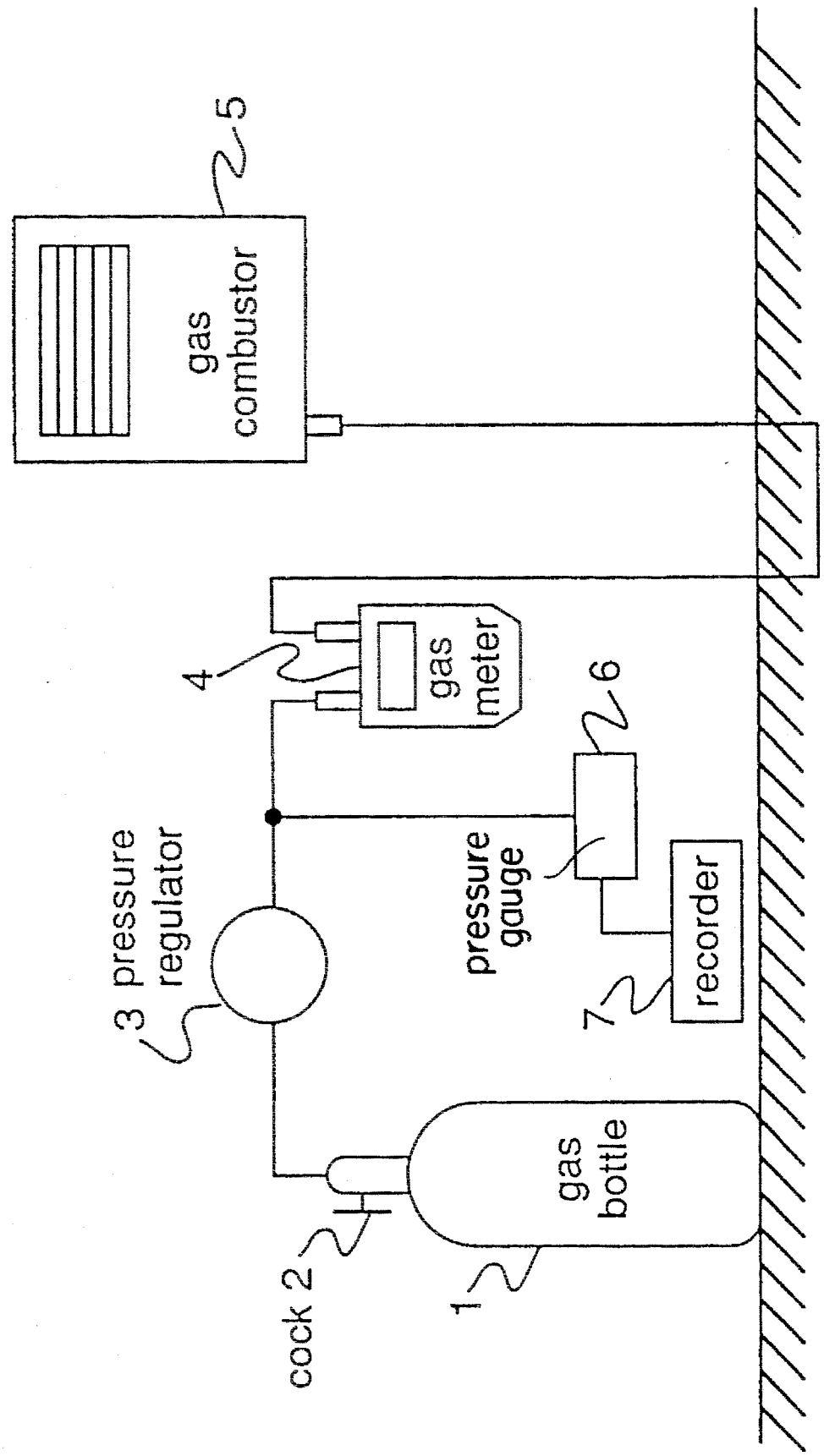
FIG. 1 is a block diagram of a safety check portion of a conventional gas supply equipment.
Figure 2:
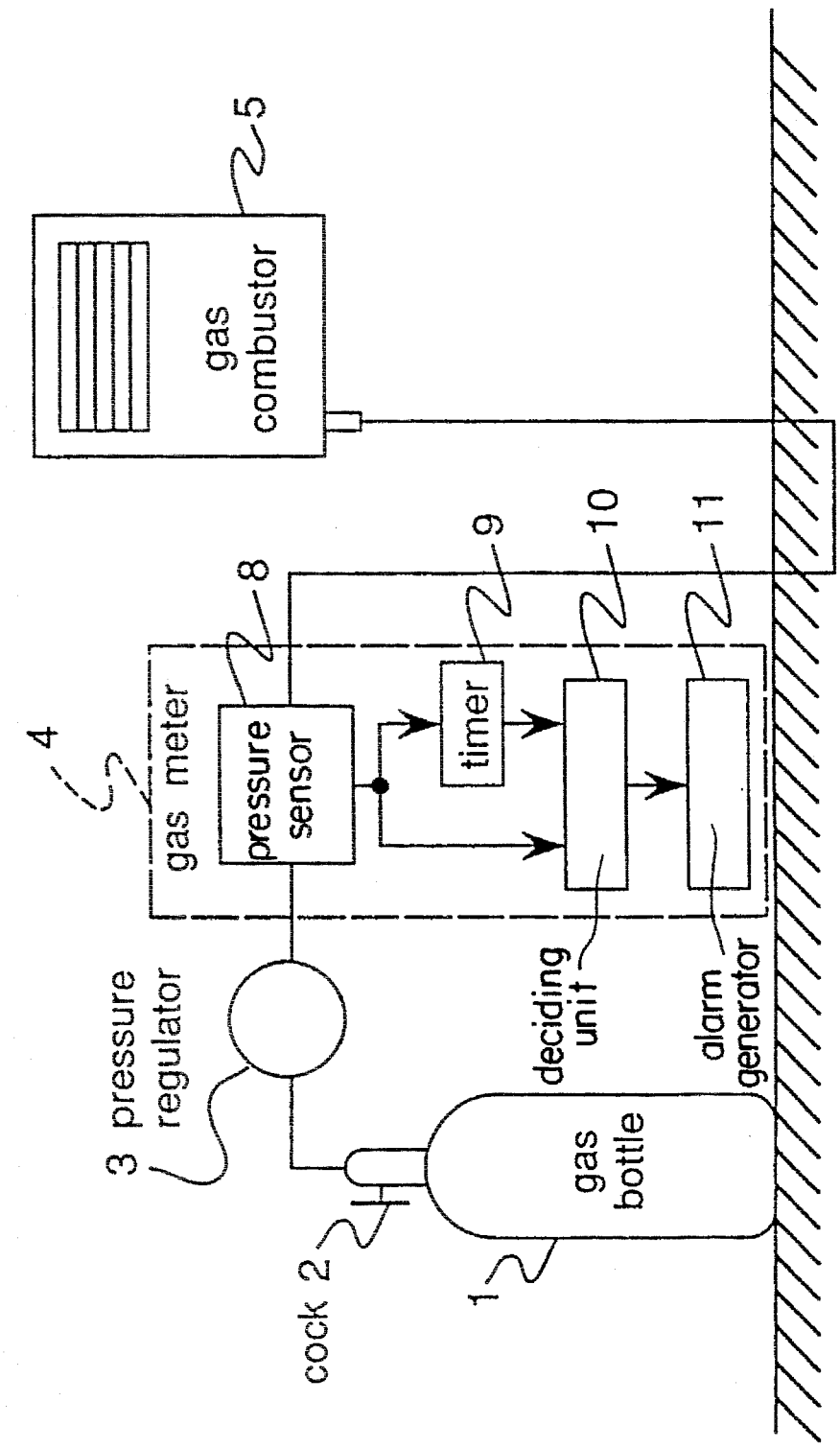
FIG. 2 is a block diagram of a conventional abnormality detecting apparatus.

Before the description of the present invention proceeds, it is to be noted that like parts are designated by like reference numerals throughout the accompanying drawings.

An abnormality detecting apparatus according to a first embodiment is described below with reference to FIGS. 3 through 5.

Figure 3:
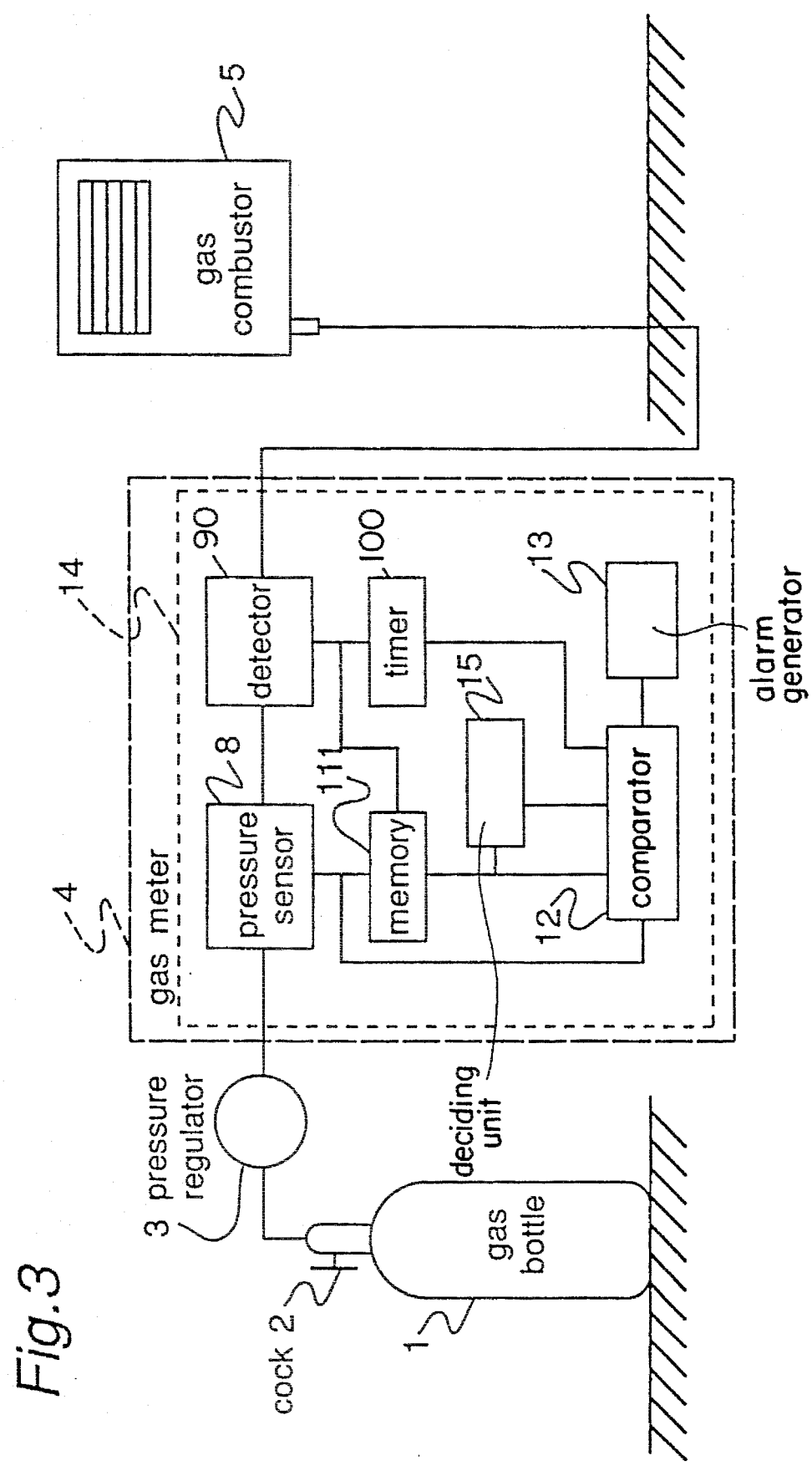
FIG. 3 is a block diagram of the function of an abnormality detecting apparatus according to a first embodiment of the present invention.
Figure 4:
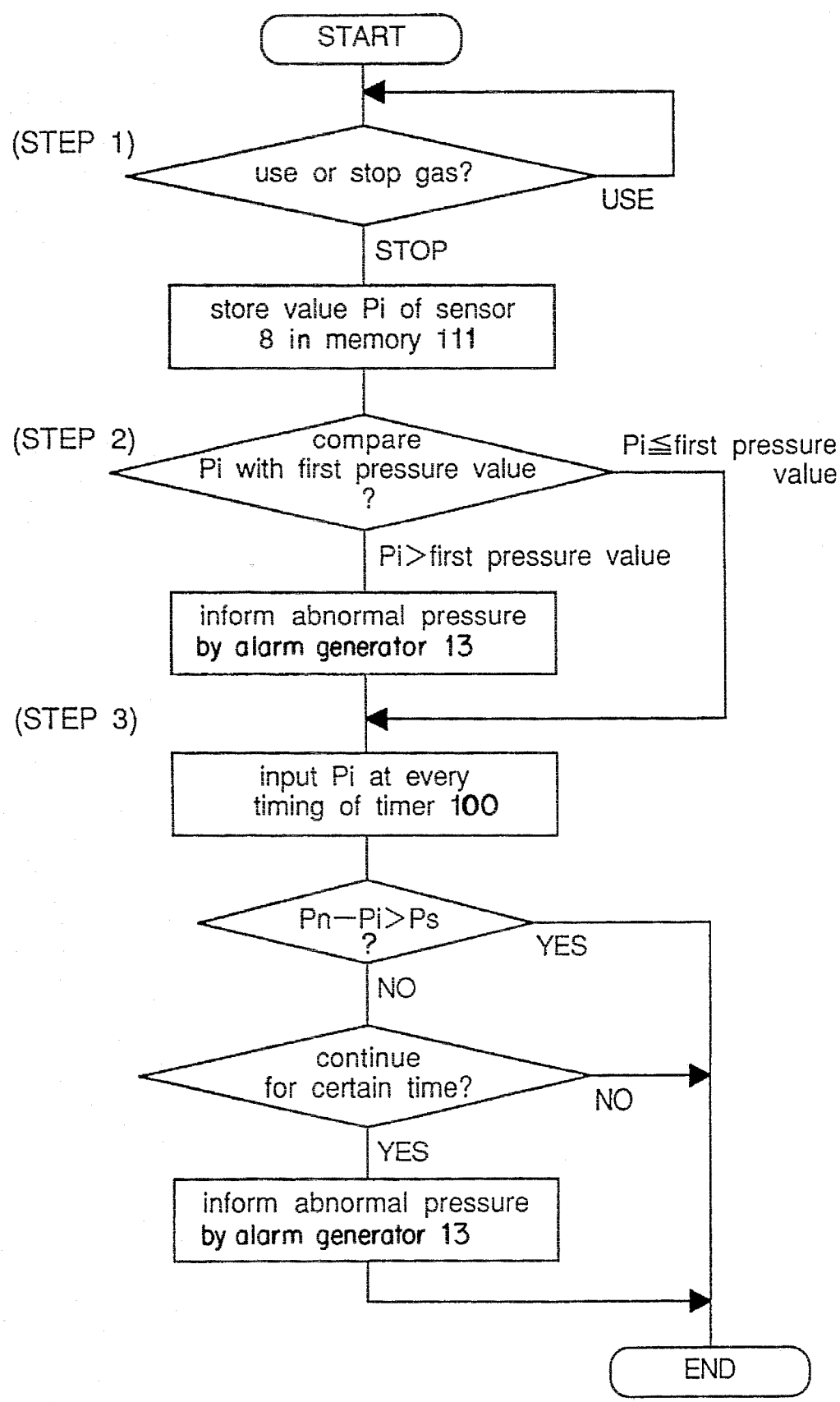
FIG. 4 is a flowchart showing the operation of the abnormality detecting apparatus.

Referring to FIG. 3, an abnormality detecting apparatus 14 incorporated in a gas meter 4 comprises a pressure sensor 8 for detecting a gas pressure in a gas supply equipment downstream of a pressure regulator 3 serving as a gas supply equipment; a flow rate detector 90 for detecting the flow rate of gas flowing in the gas supply equipment; a timer 100 which is operated on receipt of a signal from the flow rate detector 90, indicating that the gas has been turned off; a cutoff pressure memory 111 for storing a cutoff pressure indicated by a signal outputted from the pressure sensor 8; a gas pressure comparator 12 for comparing the value of a signal outputted from the pressure sensor 8 with a value held in the cutoff pressure memory 111 at a predetermined timing based on a signal outputted from the timer 100; an alarm generator 13 for outputting an alarm signal when an abnormality has occurred in the gas supply equipment; and a deciding unit 15 for comparing the value held in the cutoff pressure memory 111 with a predetermined first pressure.

The operation of the apparatus having the above-described construction is described below.

Step 1: When the gas is turned off, the flow rate detector 90 detects the turn-off of the gas, thus outputting a signal to the cutoff pressure memory 111. On receipt of the signal, the cutoff pressure storing memory 111 stores a value (Pi) detected by the pressure sensor 8.

Step 2: The cutoff pressure deciding unit 15 compares the value Pi held by the cutoff pressure memory 111 with a first pressure, namely, a predetermined abnormality deciding value held by the cutoff pressure deciding unit 15. If the value Pi is greater than the predetermined first pressure, the cutoff pressure deciding unit 15 decides that the cutoff pressure is abnormal, thus outputting an alarm signal to the alarm generator 13.

Step 3: The decision made by the cutoff pressure deciding means 15 that the cutoff pressure is abnormal unit that the pressure regulating capability of the pressure regulator 3 is abnormal. There is a case in which it is assumed that a danger such an explosion will not occur and therefore, the pressure regulator 3 is not repaired or replaced promptly even though the abnormality of the cutoff pressure has been detected. But in this case, there is a possibility that gas has leaked from the gas supply equipment.

On receipt of the signal, outputted from the flow rate detector 90, indicating the turn-off of the gas, the timer 100 starts counting time. The timer 100 outputs signals at predetermined intervals (Ts: for example, every 30 minutes) after the counting operation starts. On receipt of the signal outputted from the timer 100, the gas pressure comparator 12 compares the value of the signal outputted from the pressure sensor 8 with the value Pi held by the cutoff pressure memory 111. If a state in which the difference ($\Delta P$) between the two is not more than a predetermined value Ps continues for a certain period of time, it is decided that a gas leakage has occurred, thus outputting a signal to the alarm generator 13.

That is, the temperature of gas inside the gas supply equipment rises because the gas supply equipment is subjected to sunshine. As a result, the gas pressure rises with the rise of the outside temperature when no gas leakage occurs. If the rise of gas pressure is not observed for several days in the state in which gas has been turned off, it is decided that gas has leaked from the gas supply equipment (in particular, upstream of the gas meter 4) and thus an alarm is given.

Figure 5A:
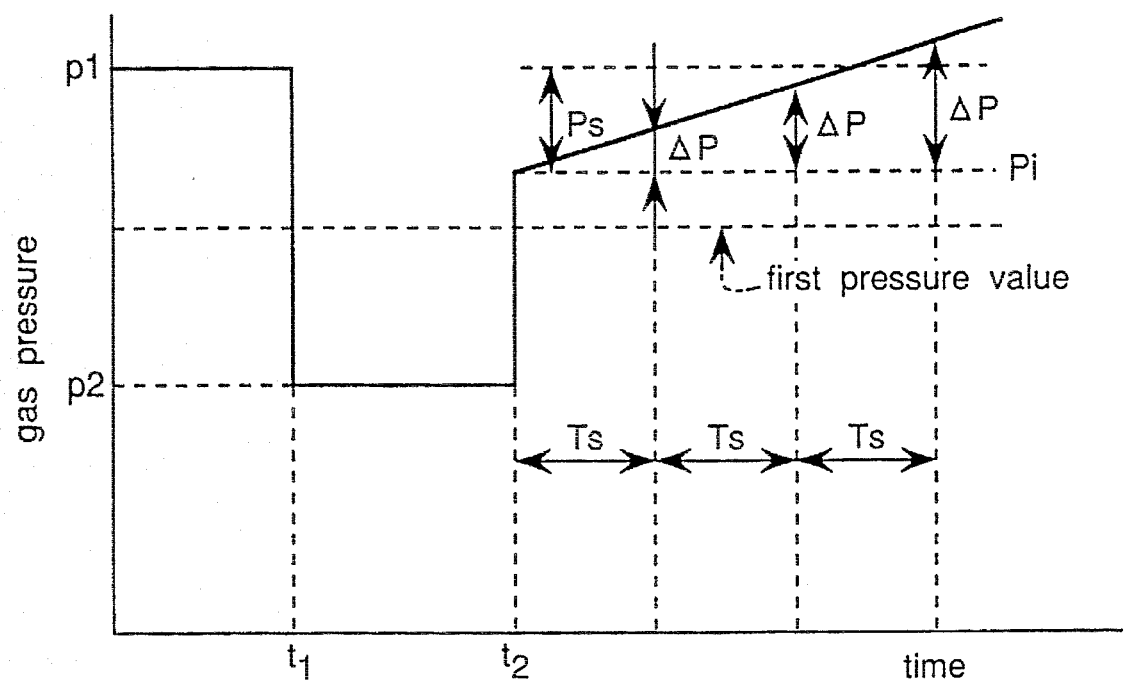
FIG. 5a is a view showing the change characteristic of a gas in the abnormality detecting apparatus (when no gas leakage has occurred)
Figure 5B:
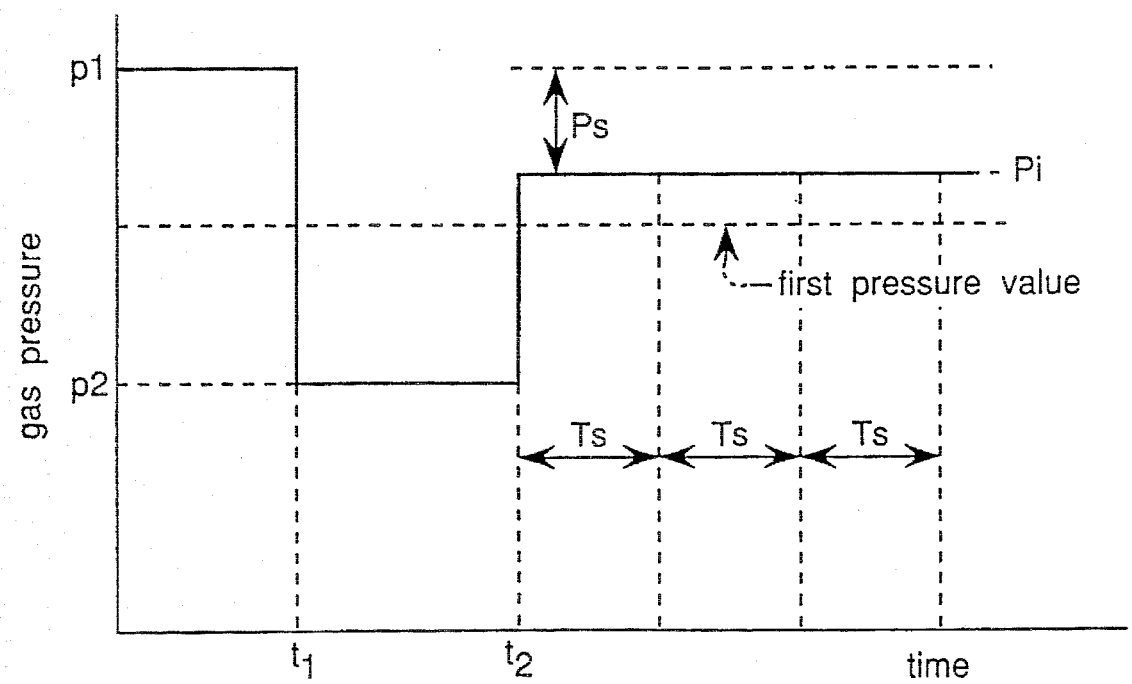
FIG. 5b is a view showing the change characteristic of a gas in the abnormality detecting apparatus (when gas leakage has occurred)

The operation of the apparatus is described below with reference to FIGS. 5a and 5b in which the abscissa indicates time and the ordinate indicates the change in gas pressure. In the case of no gas leakage Before the gas is turned on, i.e., when there is no gas flow, the gas pressure is p1. The gas pressure becomes p2 when the gas is turned on at a point t1. While the same amount of gas is flowing, the pressure regulator 3 is in operation, thus maintaining the gas pressure at p2. When the gas is tuned off at a point t2, the gas pressure is returned to the original pressure, which is a cutoff pressure. When gas has not leaked from the gas supply equipment thereafter, the temperature of the gas inside the gas supply equipment increases with the rise of the outside temperature and thus the gas pressure rises as shown in FIG. 5a. The gas pressure comparator 12 compares the value of the signal outputted from the pressure sensor 8 with the value Pi held by the cutoff pressure memory 111 at predetermined intervals (Ts: for example, every 30 minutes) on receipt of signals outputted from the timer 100. If the difference ΔP is greater than the predetermined value Ps, it is decided that gas has not leaked from the gas supply equipment and thus the check terminates.

When gas leakage has occurred

Before the gas is turned on, i.e., when there is no gas flow, the gas pressure is p1. The gas pressure becomes p2 when the gas is turned on at a point t1. While the same amount of gas is flowing, the pressure regulator 3 is in operation, thus maintaining the gas pressure at p2. When the gas is tuned off at a point t2, the gas pressure is returned to the original value, which is the cutoff pressure. When gas has leaked from the gas supply equipment thereafter, the gas pressure is as shown in FIG. 5b. The temperature of the gas inside the gas supply equipment increases with the rise of outside temperature and thus the gas pressure does not rise because gas has not leaked from the gas supply equipment. The gas pressure comparator 12 compares the value of the signal outputted from the pressure sensor 8 with the value Pi held in the cutoff pressure memory 111 at predetermined intervals (Ts: for example, every 30 minutes) on receipt of signals outputted from the timer 100. Because the difference ΔP is not greater than the predetermined value Ps, it is decided that gas may have leaked from the gas supply equipment and thus the check terminates. A check is made for a certain period of time, for example, several days to determine whether or not the gas pressure rises during no use of the gas. If the gas pressure has not risen for the period of time, it is decided that the gas has leaked from the gas supply equipment. Consequently, the alarm generator 13 outputs an alarm signal.

The gas detected when the is turned off at the point t2 is greater than the first pressure, which indicates the abnormality of the pressure regulator 3. In the first embodiment, the gas pressure comparator 12 keeps operating thereafter to monitor whether or not gas leakage has occurred.

During the turn-off of the gas, i.e., when the flow rate detector 90 has not detected a gas flow, the timer 100 keeps counting time and outputs signals at predetermined intervals. The gas pressure comparator 12 keeps receiving signals from the timer 100. The reason for continuing the observation of the state in which the rise of the gas pressure is not detected for several days with the gas instrument being not used is because the case in which the rise of gas pressure cannot be observed due to a small degree of rise in temperature caused by bad weather is considered.

In the apparatus 14 according to the first embodiment, the gas pressure comparator 12 operates on receipt of signals outputted from the timer 100 at predetermined intervals even though it is decided by the cutoff pressure deciding unit 15 that an abnormality has occurred. In this manner, gas leakage from the gas supply equipment can be detected separately from the abnormality of the cutoff pressure, namely, the abnormality of the pressure regulator.

In the first embodiment, the alarm generator 13 may be replaced with other means, for example, a telephone line connected to a gas supplier or a construction having a gas cutoff passage.

The pressure sensor 8 and the flow rate detector 9 are disposed inside the gas meter 4 in the first embodiment, but they may be disposed outside the gas meter 4.

Second Embodiment

An abnormality detecting apparatus according to the second embodiment is described below with reference to FIGS. 6 through 9.

Figure 6:
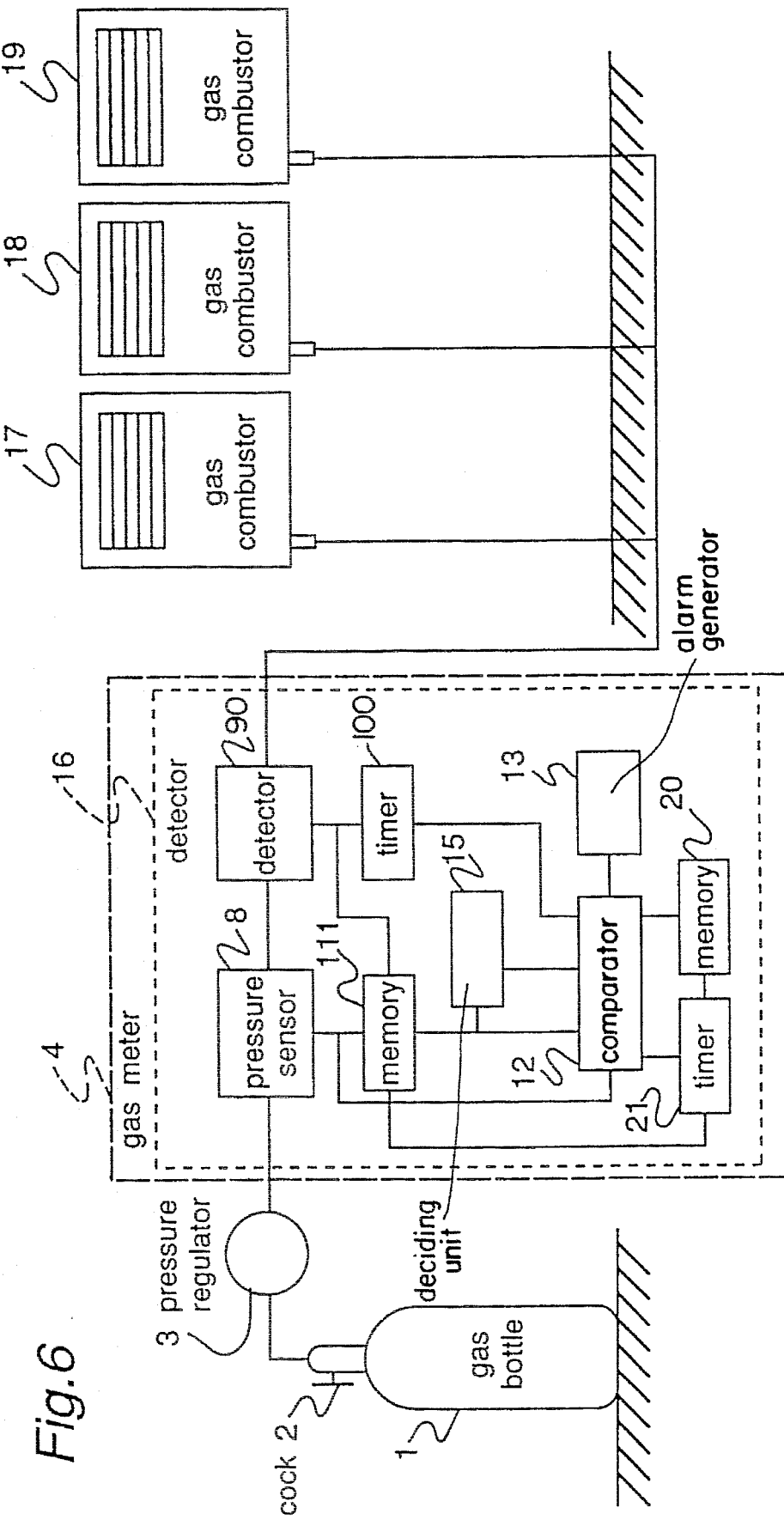
FIG. 6 is a control block diagram of a pressure abnormality monitoring apparatus according to a second embodiment of the present invention.

FIG. 6 is a block diagram of the apparatus according to the second embodiment. The abnormality detector 16 is incorporated in the gas meter 4. In the second embodiment, a gas supply equipment has gas burning instruments 17, 18, and 19. In addition to the means of the first embodiment, the detector 16 comprises a measuring time memory 20 for storing detection delay time of cutoff pressure, detected after the gas is turned off, in accordance with the difference between a gas pressure detected before the gas is turned on and a gas pressure during the use of the gas, on receipt of signals outputted from the pressure sensor 8; and a second timer 21 for outputting a signal indicating a delay time in the pressure measurement to the cutoff pressure memory 111 on receipt of a signal, indicating a delay time in the pressure measurement, outputted from the measuring time memory 20, when the second timer 21 has counted the delay time in the pressure measurement.

Figure 7:
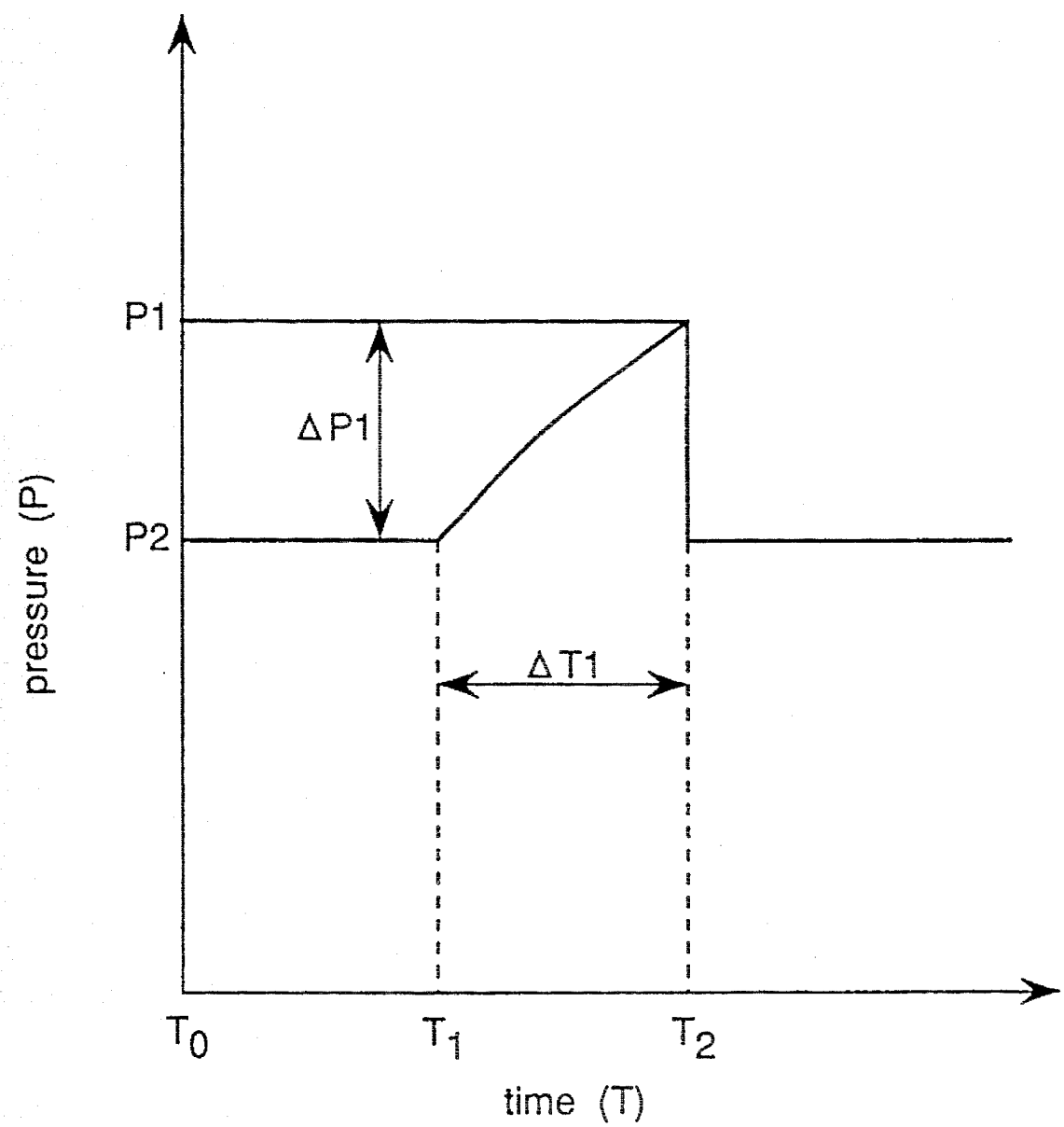
FIG. 7 is a view showing the change characteristic of a gas in the pressure abnormality monitoring apparatus according to the second embodiment of the present invention.

The gas pressure comparator 12 receives a pressure signal outputted from the pressure sensor 8 and a flow rate deciding signal from the flow rate detector 90, thus deciding whether or not the gas pressure is normal as follows: FIG. 7 shows pressure signals outputted from the pressure sensor 8 at respective times. The pressure signal is an analog signal indicating a value proportional to a gas pressure.

Inspection of pressure fluctuation during no use of gas (inspection of gas leakage)

As shown in FIG. 7, when the gas pressure rises due to sunshine on a gas pipe 5 and fluctuation in outside temperature during a period of time T=T1–T2 in which the gas is turned off, it is decided that no gas leakage has occurred from the gas pipe 5 and the gas meter 4. For reference, the pressure rise of cutoff gas is 365 (Pa/° C.) according to Boyle-Charles' law.

Figure 8:
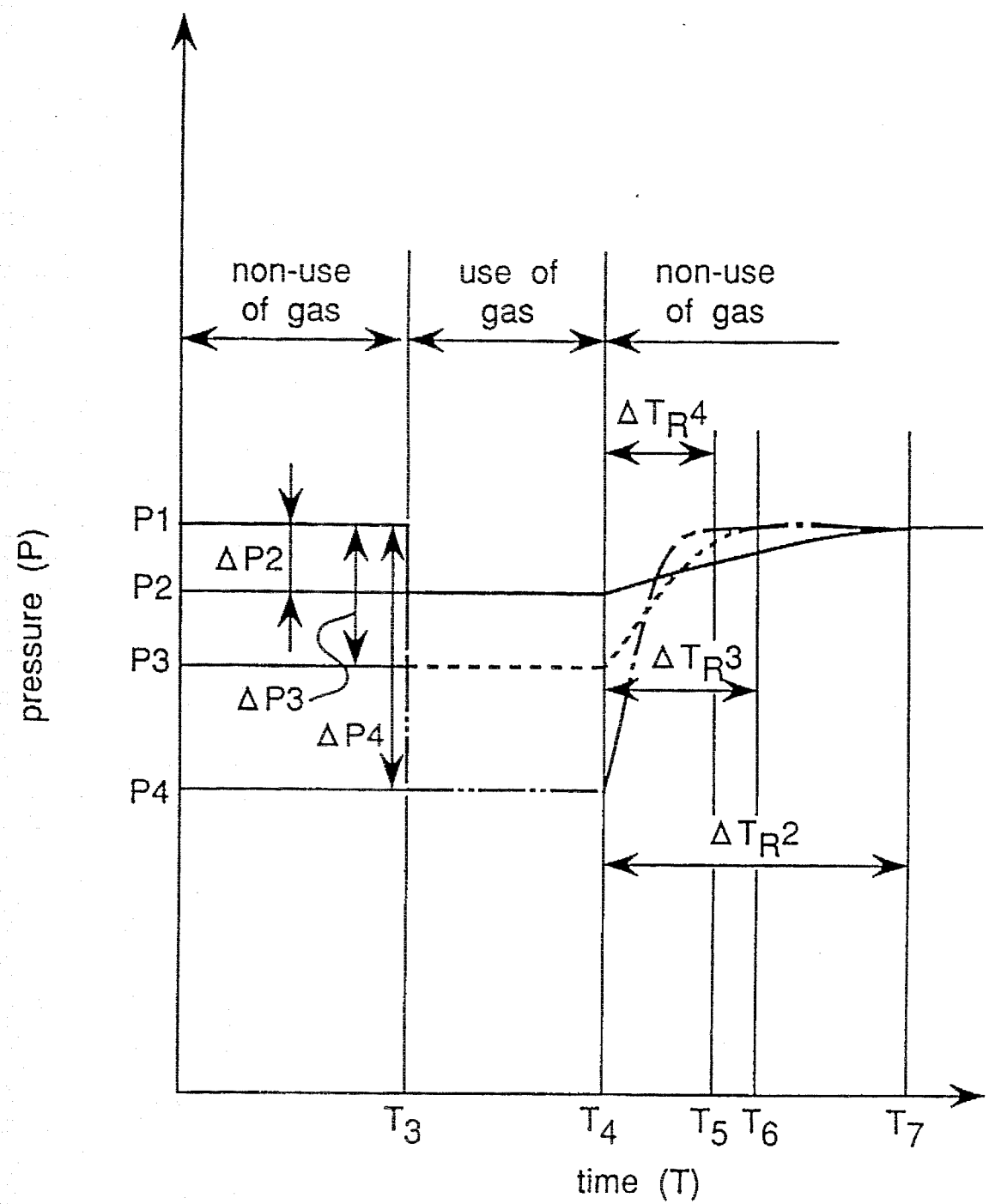
FIG. 8 is a view showing the change characteristic of a gas in the pressure abnormality monitoring apparatus according to the second embodiment of the present invention in the case where gas.

At this time, there is a difference in the increase in the gas pressure depending on the frequency of use of the gas burning instrument. The increase in the gas pressure is small when the gas is used at a high frequency of use. Therefore, it is necessary to accurately detect whether or not the gas pressure has increased. FIG. 8 shows the characteristic of gas pressure fluctuation during no use of the gas, and use of the gas, and no use of the gas.

Figure 9:
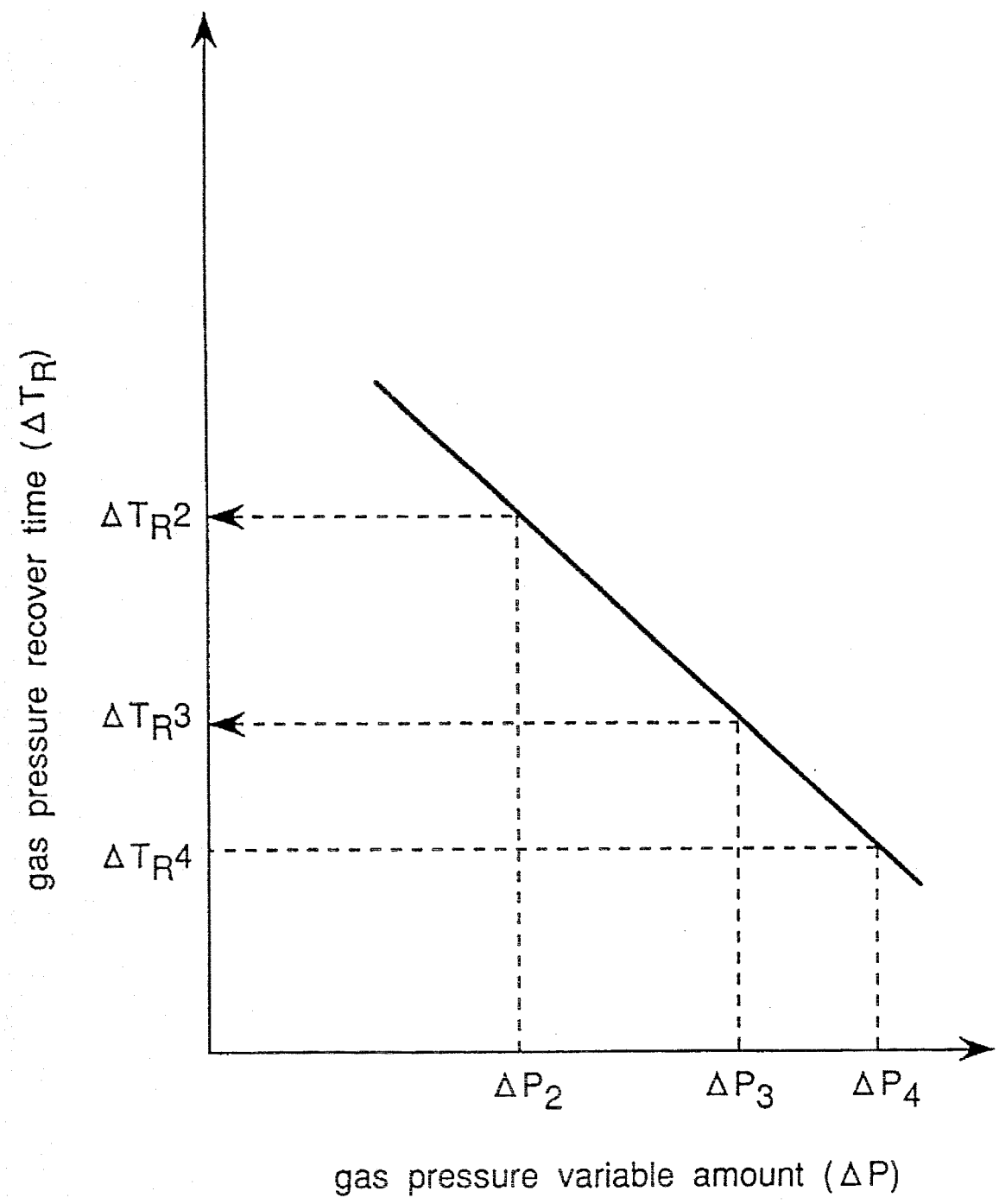
FIG. 9 is view showing the relationship between the fluctuation amount of gas pressure and recovery time of gas pressure in the pressure abnormality monitoring apparatus according to the second embodiment of the present invention.

During the use of the gas in time T=T3–T4, not only is the fluctuation of the gas pressure (pressure reduction amount at the start of use of the gas: ΔP2=P1–P2, ΔP3=P1–P3, ΔP4= P1–P4) but also the recovery period of time ΔTR of gas pressure (ΔTR4=T5–T4, ΔTR3=T6–T4, ΔTR2=T7–T4; T4, T5, and T6 show time at which a gas pressure returns to a gas pressure before use of the gas) are different from each other according to the combustion amount of each of the gas burning instruments 17, 18, and 19. As shown in FIG. 9, there is a correlation between the fluctuation of the gas pressure and the recovery period of time of gas pressure. Normally, in the gas burning instrument, recovery period of time of gas pressure becomes shorter as the fluctuation of the gas pressure increases. Accordingly, based on FIG. 9, a pressure measurement delay period of time Tc of a cutoff pressure measured when the gas has been turned off is found according to the difference between a pressure before use of the gas and a pressure during use of the gas. Then, the flow rate detector 90 detects a gas cutoff pressure when the gas pressure has returned to a pressure before use of the gas, and the cutoff pressure memory 111 stores the detected gas pressure (initial cutoff pressure). Gas cutoff pressures are measured at constant intervals based on the initial cutoff pressure, and both gas pressures are compared with each other. It is decided that gas has not leaked from the gas supply equipment if a predetermined pressure rise is detected during a certain period of time. Thus, a pressure fluctuation due to the rise of the outside temperature can be monitored accurately after the gas is turned off.

In the second embodiment, the pressure measurement delay period of time Tc of the cutoff pressure generated after the gas is turned off is found based on FIG. 9 and according to the difference between a pressure before the gas is turned on and a pressure during use of the gas. But a similar effect can be obtained by finding the pressure measurement delay period of time Tc by the gas flow rate, during use of the gas, proportional to the difference between the gas pressure before the gas is turned on and the gas pressure during use of the Third Embodiment An abnormality detecting apparatus according to the third embodiment is described below with reference to FIGS. 10 through 14.

Figure 10:
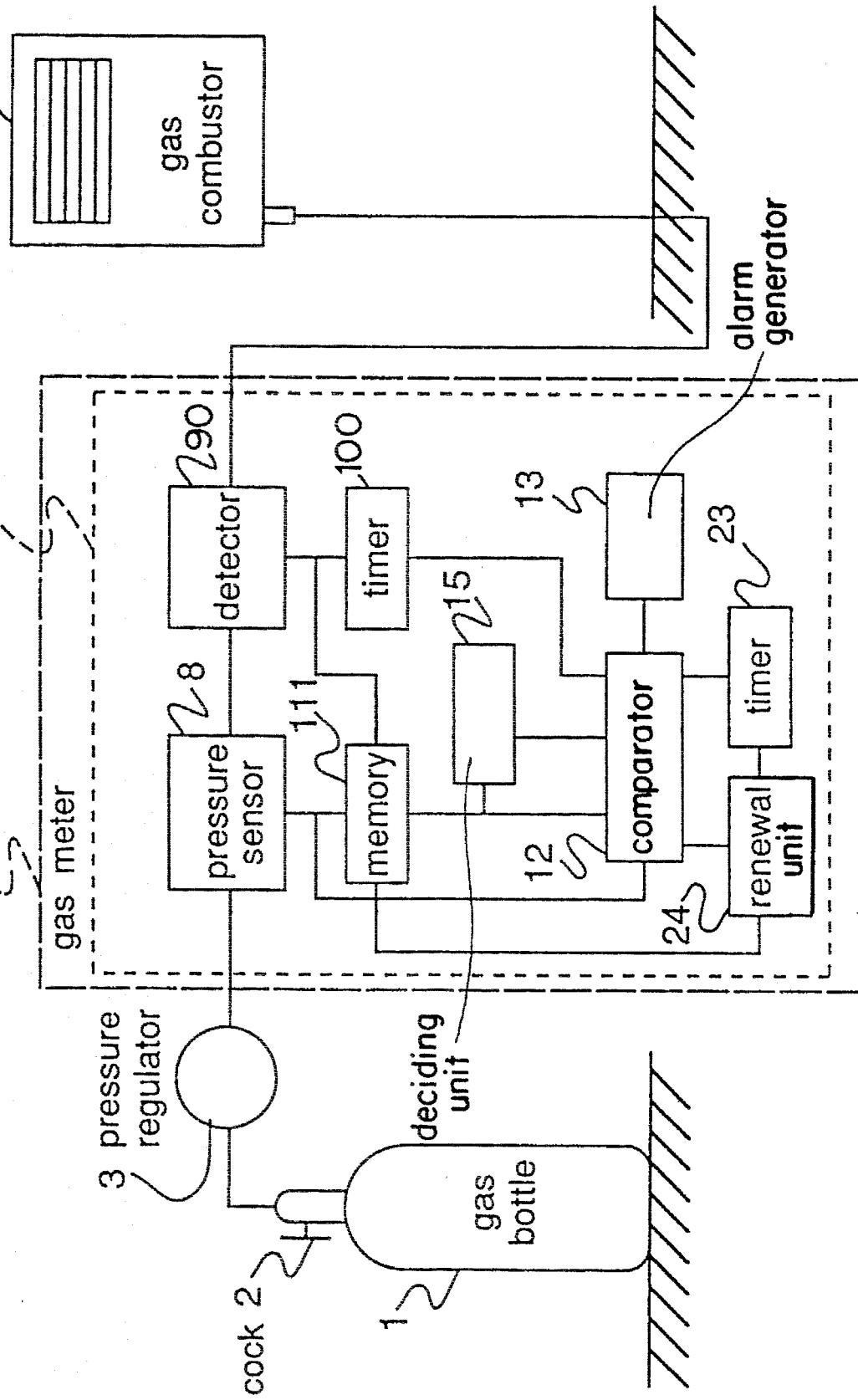
FIG. 10 is a control block diagram of an abnormality detecting apparatus according to a third embodiment of the present invention.

FIG. 10 is a control block diagram of the apparatus according to the third embodiment. The abnormality detecting apparatus 22 is incorporated in the gas meter 4. In addition to the means of the first embodiment, the apparatus 22 comprises a third timer 23 for outputting clock signals at first predetermined intervals after the gas is turned off; and a first cutoff pressure reference value renewal unit 24 for updating a cutoff pressure on receipt of a clock signal outputted from the third timer 23, thus outputting a signal to the cutoff pressure memory 111 so that the cutoff pressure memory 111 stores an updated cutoff pressure reference value.

Figure 11:
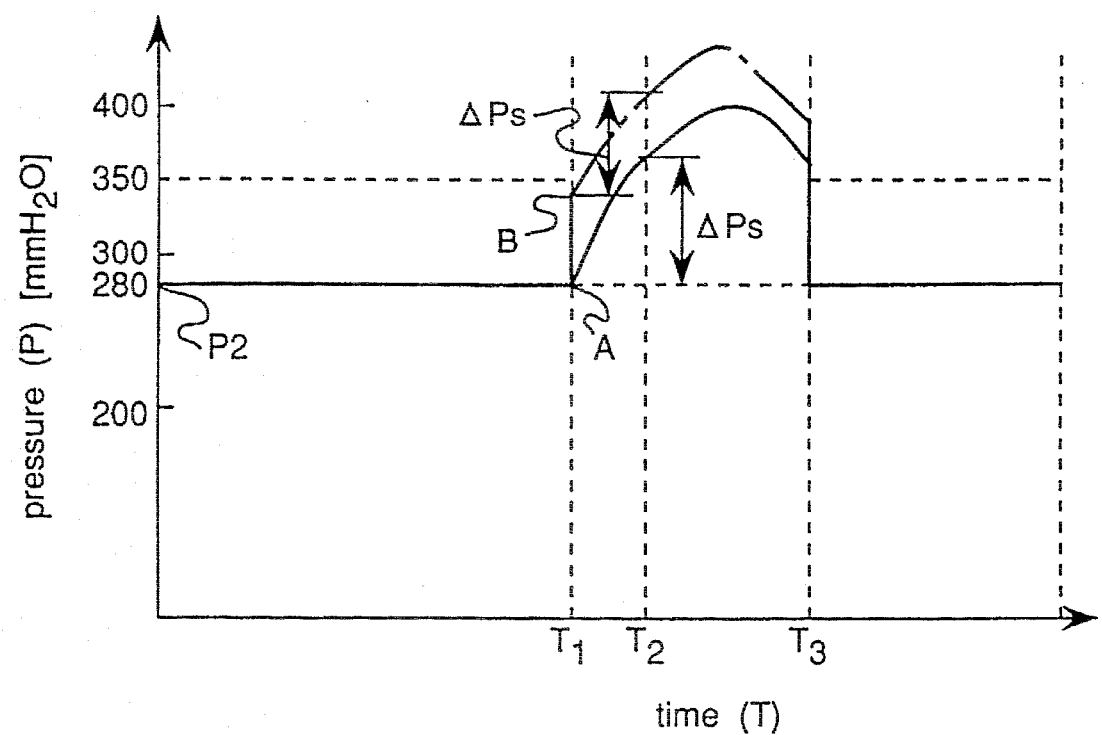
FIG. 11 is a view showing the change characteristic of pressure in the abnormality detecting apparatus according to the third embodiment of the present invention.
Figure 12:
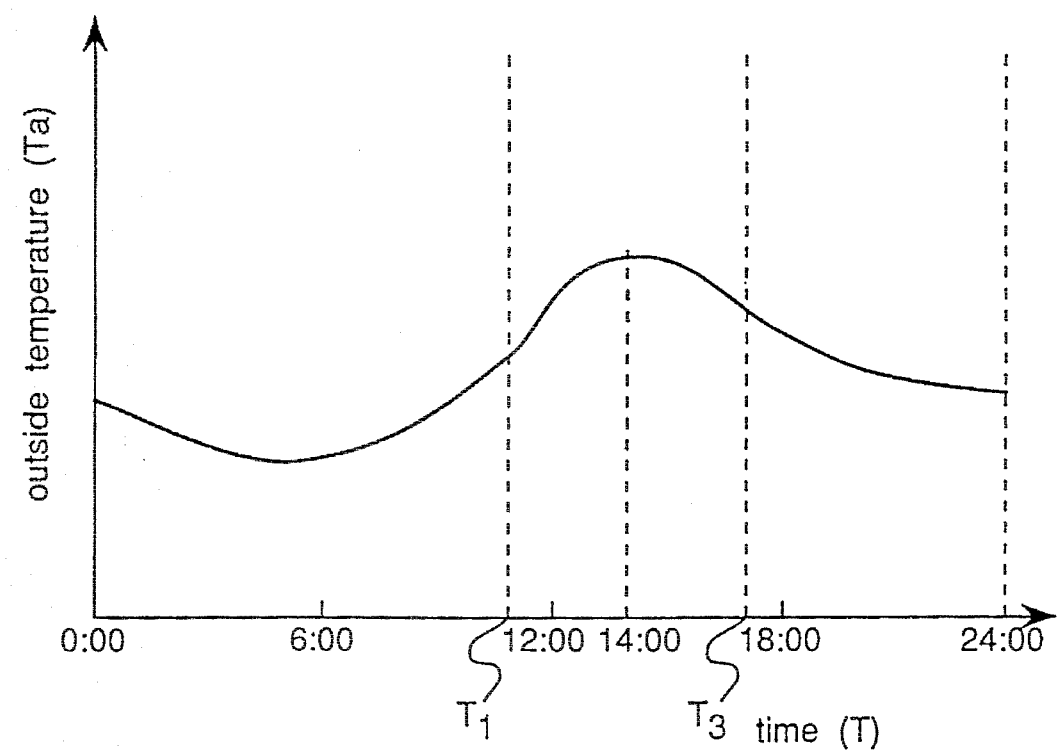
FIG. 12 is a view showing the change characteristic of outside temperature in the abnormality detecting apparatus according to the third embodiment of the present invention.

The gas pressure comparator 12 receives a pressure signal outputted from the pressure sensor 8 and a gas flow rate signal from the flow rate detector 90, thus deciding whether or not the gas pressure is normal as follows:

FIG. 11 shows the pressure signal P outputted from the pressure sensor 8 at respective times T. The pressure signal is an analog signal indicating a value proportional to a gas pressure. FIG. 12 shows the relationship between time T and outside temperature Ta. The temperature of gas inside the gap pipe shows a value close to the outside temperature Ta. Inspection of pressure fluctuation during no use of gas (inspection on gas leakage)

As shown in FIG. 11, during no use of the gas in time T1–T2–T3, the gas pressure rises because the gas pipe is subjected to sunshine and fluctuation in outside temperature. The pressure rise of the cutoff gas is 365 (Pa/° C.) according to Boyle-Charles' law. Normally, the temperature inside the gas pipe rises from about 6:00 to 14:00 in accordance with outside temperature as shown in FIG. 12. During a gas pressure rise between T1 and T2 in which the gas is turned off, the gas pressure comparator 12 compares an initial cutoff pressure at T=T1 stored in the cutoff pressure memory 111 with the value of each of cutoff pressure signals outputted from the first timer 100 at predetermined intervals (every 15 minutes to 30 minutes), with the cutoff pressure rising. That is, it is decided that gas has not leaked from the pressure regulator 3, the gas pipe, the gas meter 4 or the gas burning instrument 5.

At this time, the initial cutoff pressure becomes nonuniform according to the feature, for example, the temperature characteristic of the pressure regulator 3 and change with the passage of time as shown by initial cutoff pressures A and B in FIG. 11. But when outside temperature Ta is comparatively high or when the gas supply equipment is disposed in a place subjected to sunshine, the gas pressure rises considerably. Therefore, the initial cutoff pressures A and B exceed a predetermined pressure rise deciding level (ΔPS) in the vicinity of T=T2. Thus, it can be decided that no leakage has occurred from the gas supply equipment.

A great pressure rise does not necessarily occur when the weather is not fine, cloudy or rainy at the outside temperature Ta. There is a case in which the gas is turned off when the outside temperature is low.

Figure 13:
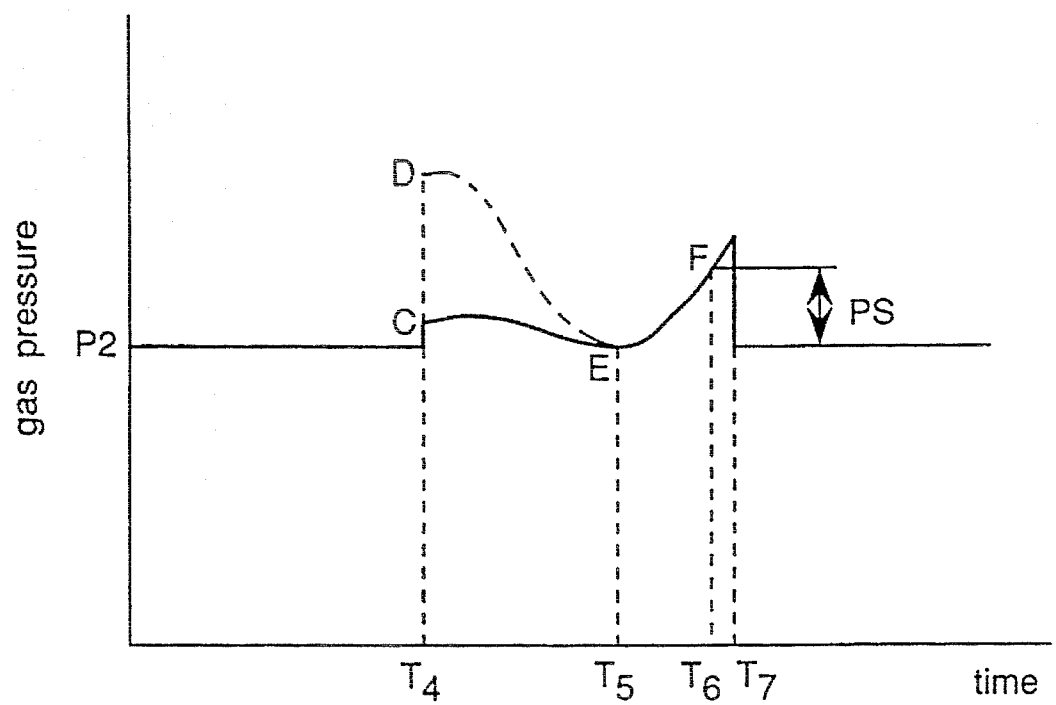
FIG. 13 is a view showing the change characteristic of pressure in the abnormality detecting apparatus according to the third embodiment of the present invention.
Figure 14:
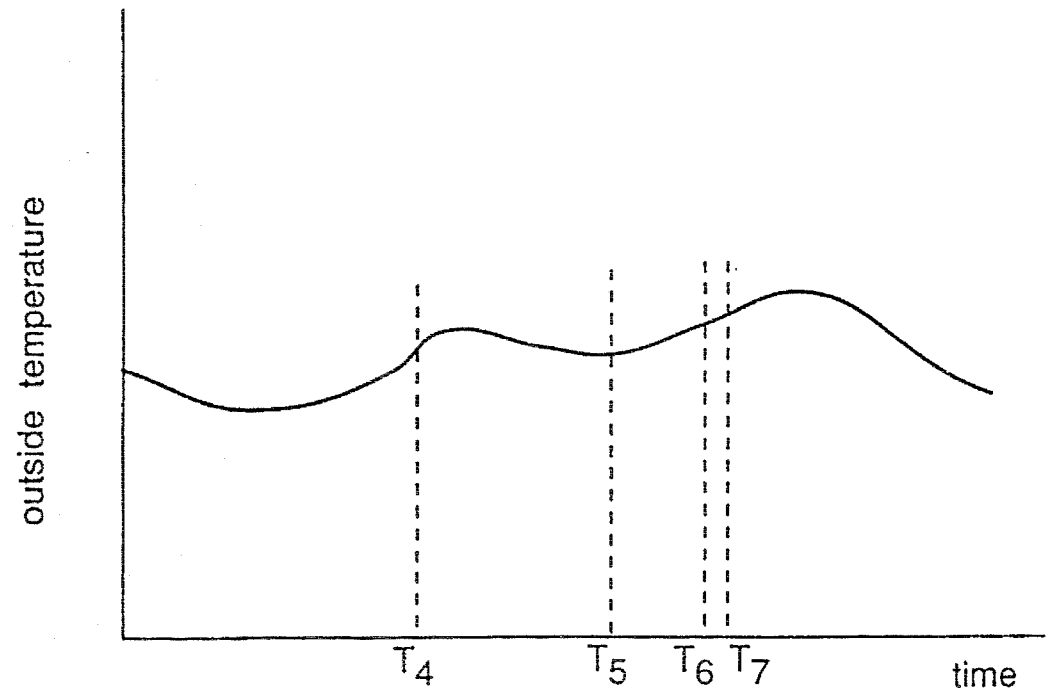
FIG. 14 is a view showing the change characteristic of outside temperature in the abnormality detecting apparatus according to the third embodiment of the present invention.

As shown in FIGS. 13 and 14, supposing that in a certain time period in which the gas has been turned off, the gas pipe is not subjected to sunshine and the outside temperature does nor rise, whereas in time periods T4–T5–T6–T7 in which gas is not used, the gas pressure rises due to the increase in the outside temperature after a certain time period as shown in FIG. 14. When the gas pressure has started to rise, the outside temperature becomes lower than that at the time when the gas has been turned off and then, rises after T=T5. When gas pressure is rising during T=T4–T7 in which the gas is not used, the gas pressure comparator 12 compares the initial cutoff pressure at T=T4 stored in the cutoff pressure memory 111 with the value of each cutoff pressure signal at regular intervals (every 15 to 30 minutes) outputted from the first timer 100. At this time, the initial cutoff pressure is nonuniform, similar to that shown in FIG. 11, and is stored in the cutoff pressure memory 111 and is due to the characteristic of the cutoff pressure of the pressure regulator 3 such as the temperature characteristic and change with the passage of time as shown by C and D of FIG. 13. Regardless of whether the initial cutoff pressure is low (C of FIG. 13) or high (D of FIG. 13), the cutoff pressure drops from the initial cutoff pressure to a predetermined pressure level (pressure PK regulated by the pressure regulator) owing to the contraction of gas inside the gas supply equipment caused by the reduction of the outside temperature and governor characteristic of the pressure regulator.

The first cutoff pressure reference value renewal unit 24 receives clock signals outputted from the third timer 23 at the first predetermined intervals, thus updating the cutoff pressure reference value from the initial cutoff pressure to the cutoff pressure PK at T=T5 so that the cutoff pressure memory 111 stores the cutoff pressure PK detected at the time of no use of the gas as a cutoff pressure reference value.

Thereafter, the cutoff pressure exceeds a predetermined pressure rise deciding level ΔPS (point F in FIG. 13) at T=T6. Therefore, it can be decided that gas has not leaked from the gas supply equipment.

During the period of time T4–T5–T6–T7 in which gas is not used, the gas pressure comparator 12 decides that gas has leaked from the gas supply equipment (the pressure regulator 3, the gas meter 4 or the gas pipe) if the gas pressure does not rise due to sunshine on the gas pipe and the rise in the outside temperature. If the rise of the gas pressure is not detected for a certain period of time, the gas pressure comparator 12 decides that gas has leaked from the gas supply equipment (the pressure regulator 3, the gas meter 4, the gas pipe). As a result, the alarm generator 13 outputs an alarm signal by a telephone line.

The gas pressure comparator 12 may be formed of a microcomputer using software logic or a digital circuit.

An abnormality detecting apparatus according to the fourth embodiment is described below with reference to FIGS. 13, 14, and 15.

Figure 15:
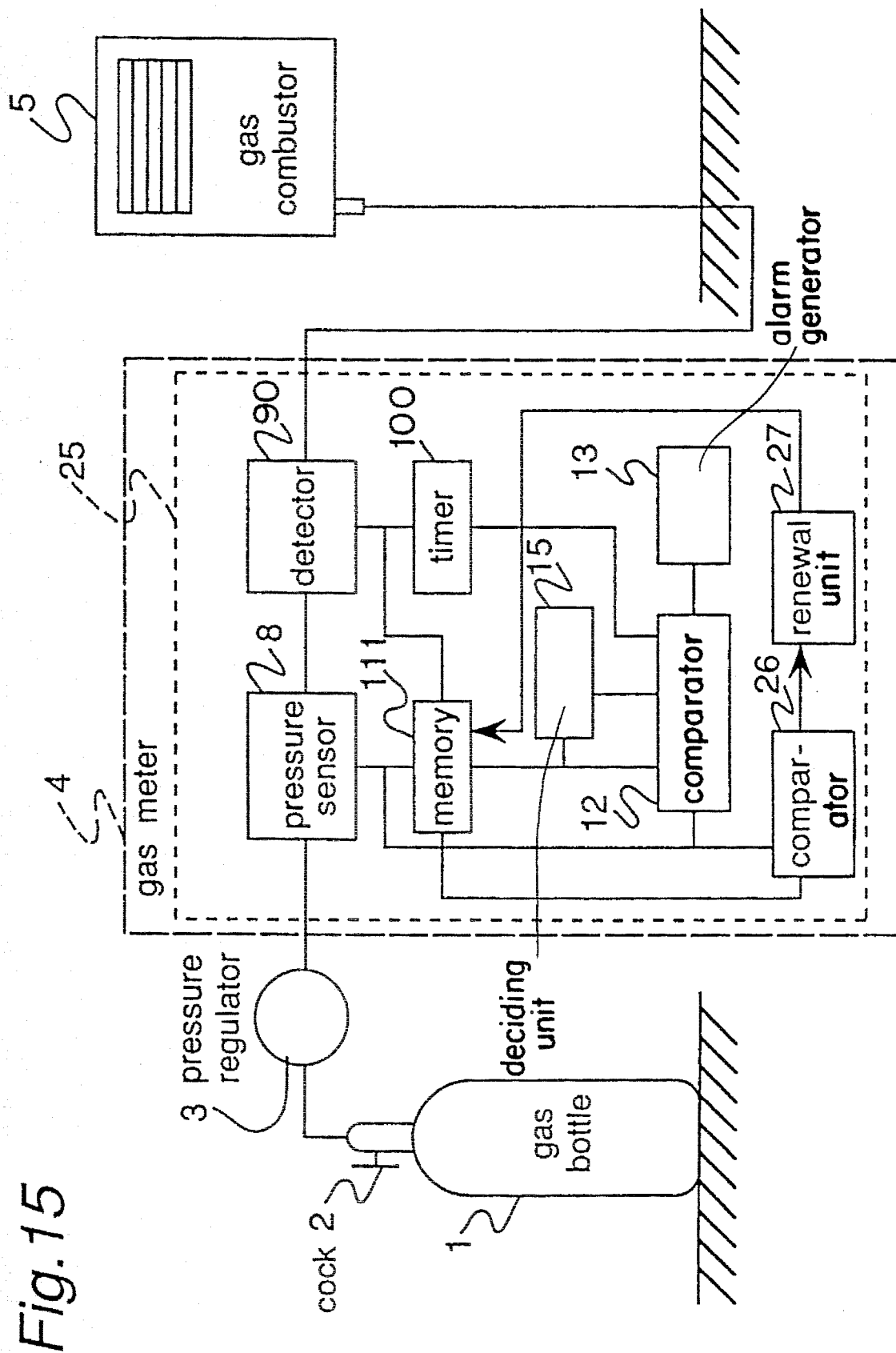
FIG. 15 is a control block diagram of an abnormality detecting apparatus according to a fourth embodiment of the present invention.

FIG. 15 is a block diagram showing an apparatus 25 according to the fourth embodiment. The apparatus 25 is incorporated in the gas meter 4.

In addition to the means of the first embodiment, the apparatus 25 further comprises a comparator 26 for comparing a pressure signal outputted from the pressure sensor 8 with a cutoff pressure reference value outputted from the cutoff pressure memory 111, thus outputting a signal indicating the difference therebetween; and a second cutoff pressure reference value renewal unit 27 for updating a cutoff pressure reference value on receipt of a clock signal outputted from the comparator 26, thus outputting a signal indicating an updated cutoff pressure reference value to the cutoff pressure memory 111 when a pressure signal outputted from the pressure sensor 8 is lower than the cutoff pressure reference value stored in the cutoff pressure memory 111 so that the cutoff pressure memory 111 stores the updated cutoff pressure reference value.

The operation of the apparatus is described below with reference to FIGS. 13 and 14.

Inspection of pressure fluctuation during no use of gas (inspection of gas leakage)

As shown in FIGS. 13 and 14, supposing that in a certain time period in which the gas has been turned off, the gas pipe is not subjected to sunshine and the outside temperature does nor rise, whereas in time periods T4–T5–T6–T7 in which gas is not used, the gas pressure rises due to the increase in the outside temperature after a certain time period as shown in FIG. 14. When the gas pressure has started to rise, the outside temperature becomes lower than that at the time when the gas has been turned off and then, rises after T=T5. When gas pressure is rising during T=T4–T7 in which the gas is not used, the comparator 26 compares an initial cutoff pressure at T=T4 stored in the cutoff pressure memory 111 with a cutoff pressure detected by the pressure sensor 8. At this time, the initial cutoff pressure is nonuniform, similar to that shown in FIG. 11, and is stored in the cutoff pressure memory 111 and is due to the characteristic of the cutoff pressure of the pressure regulator 3 such as the temperature characteristic and change with the passage of time as shown by C and D of FIG. 13. Regardless of whether the initial cutoff pressure is low (C of FIG. 13) or high (D of FIG. 13), the cutoff pressure drops from the initial cutoff pressure to a predetermined pressure level (pressure PK regulated by the pressure regulator) owing to the contraction of gas inside the gas supply equipment caused by the reduction of outside temperature and governor characteristic of the pressure regulator.

The comparator 26 outputs the signal obtained by the comparison to the second cutoff pressure reference value renewal unit 27 when the gas cutoff pressure is lower than the initial cutoff pressure detected at the time of nonuse of the gas. The second cutoff pressure reference value renewal unit 27 updates the cutoff pressure reference value from the initial cutoff pressure to the cutoff pressure PK at T=T5 so that the cutoff pressure memory 111 stores the cutoff pressure PK as a cutoff pressure reference value.

The operation to be performed subsequently by the apparatus is similar to that performed by the third embodiment.

An abnormality detecting apparatus according to the fifth embodiment is described below with reference to FIGS. 16 through 18.

Figure 16:
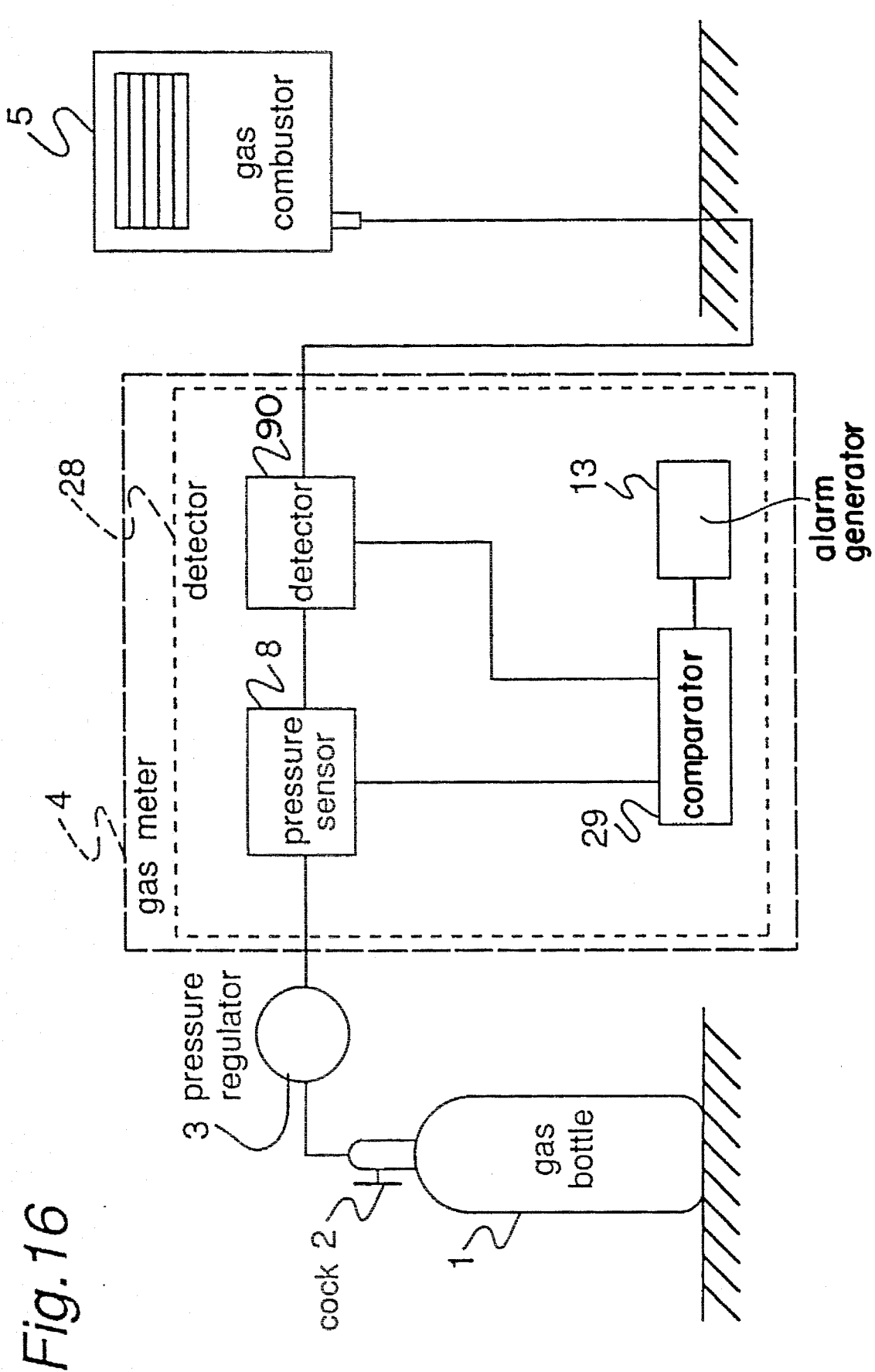
FIG. 16 is a control block diagram of an abnormality detecting apparatus according to a fifth embodiment of the present invention.

FIG. 16 is a block diagram showing an apparatus 28 according to the fifth embodiment. The apparatus 28 is incorporated in the gas meter 4.

The apparatus 28 comprises a gas pressure comparator 29 for comparing the value of each of cutoff pressure signal outputted from the pressure sensor 8 and a predetermined first pressure deciding value (upper limit value in deciding whether or not gas pressure is normal) with each other on receipt of the cutoff pressure signals outputted from the pressure sensor 8 and a gas flow rate signal outputted from the flow rate detector 90, when the flow rate of the gas is at a minimum. Thus, the gas pressure comparator 29 decides whether or not the pressure in the gas supply equipment is normal.

When the flow rate of the gas is at a maximum, the gas pressure comparator 29 compares the pressure signal outputted from the pressure sensor 8 and a predetermined second deciding value (lower limit value in deciding whether or not gas pressure is normal) with each other. Thus, the gas pressure comparator 29 decides whether or not the pressure of the gas supply equipment is normal.

When the gas pressure comparator 29 detects abnormality, it informs the alarm generator 13 of the abnormality.

On receipt of the pressure signal outputted from the pressure sensor 8 and the gas flow rate signal outputted from the flow rate detector 90, the gas pressure comparator 29 decides whether or not the gas pressure in the gas supply equipment is normal as follows: FIG. 17 shows the pressure signal P outputted from the pressure sensor 8 at respective times T. The pressure signal is an analog signal indicating a value proportional to a gas pressure. FIG. 18 shows the relationship between time T and gas flow rate signal Q outputted from the flow rate detector 90.

Inspection of pressure fluctuation during use of gas (inspection of gas pressure measured by pressure sensor)

Figure 17:
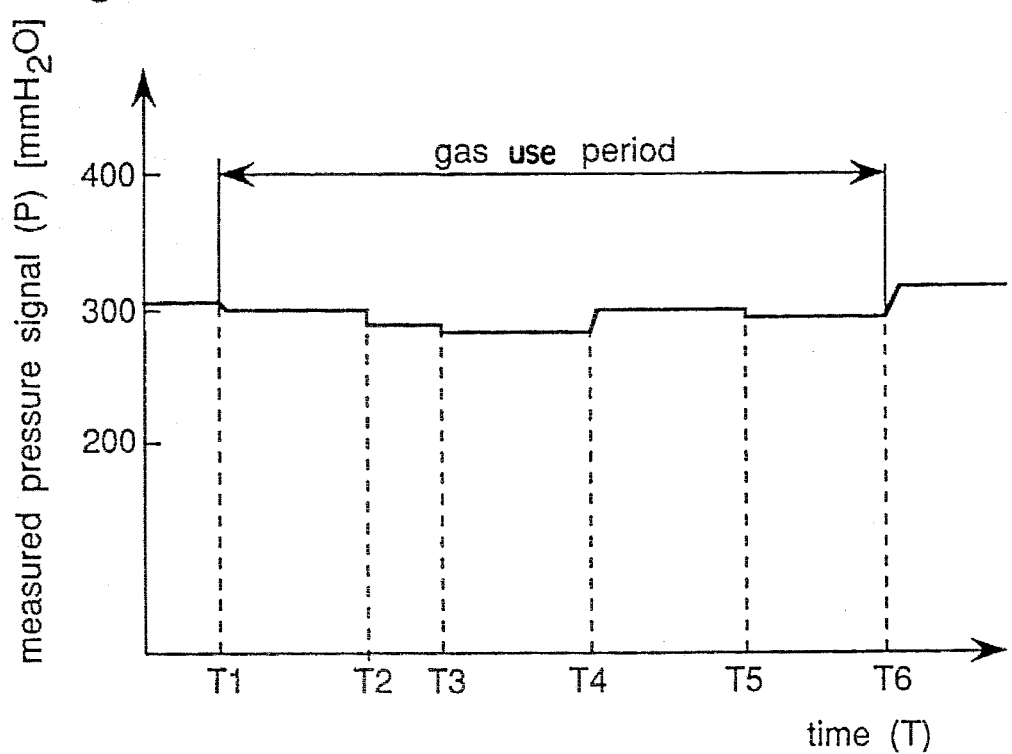
FIG. 17 is a view showing the change characteristic of pressure in the abnormality detecting apparatus according to the fifth embodiment of the present invention.
Figure 18:
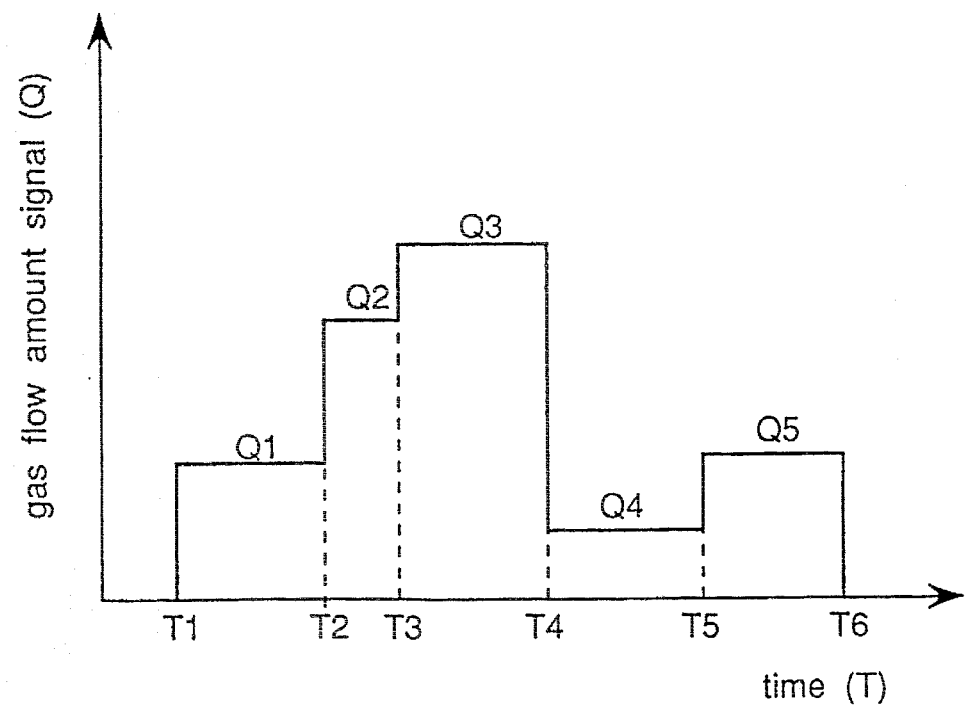
FIG. 18 is a view showing the change characteristic of gas flow rate in the abnormality detecting apparatus according to the fifth embodiment of the present invention.

As shown in FIGS. 17 and 18, during the use of the gas at a time period T=T1–T6, there is a tendency that the pressure of gas, namely, the value of a signal indicating a pressure measured by the pressure sensor 8 fluctuates according to a gas flow rate and the pressure regulating characteristic of the pressure regulator 3, i.e., the value of the pressure signal becomes lower with the increase in gas flow rate and becomes higher with the decrease in gas flow rate.

The gas is turned on at T=T1 on a first burning instrument having a flow rate Q1. Similarly, the gas is burned by the second, third, fourth, and fifth burning instruments at T=T2, T=T3, T=T4, T=T5, respectively. The gas flow rate of each of the burning instruments is Q2, Q3, Q4, and Q5, respectively. At T=T6, the gas is turned off. At this time, the gas pressure comparator 29 receives a flow rate signal from the flow rate detector 90 and a pressure signal from the pressure sensor 8 when the gas is turned on at a point T=T1 in order to make the pressure signal as a reference in comparison of gas flow rates.

Then, flow rate changes to Q2 to Q3 at T=T2, T3, respectively. The flow rates Q2 and Q3 are greater than the flow rate Q1 measured at T=T1 at which the gas is initially turned on. Thus, the gas pressure comparator 29 decides whether or not the flow rates Q2 and Q3 are lower than the standardized lower limit (for example, 2300 Pa) of the gas pressure detected by the pressure sensor 8.

Flow rate decreases at T=T4 and the flow rate Q4 is smaller than the maximum Q3. Thus, the gas pressure comparator 29 decides whether or not the pressure detected by the pressure sensor 8 exceeds the upper limit 3300 Pa.

Accordingly, the gas pressure comparator 29 decides whether or not the pressures detected by the pressure sensor 8 are lower than the standardized lower limit 2300 Pa at times T=T1–T2–T3 of times T=T1–T6 in which the gas is used. Further, the gas pressure comparator 29 decides whether or not the pressures detected by the pressure sensor 8 are greater than the standardized upper limit 3300 Pa at times T=T1–T2 and T=T4–T5.

That is, the gas pressure comparator 29 makes a comparison between the maximum pressure detected by the pressure sensor 8 and the standardized upper limit and between the minimum pressure detected by the pressure sensor 8 and the standardized lower limit.

If the highest pressure exceeds the upper limit (3300 Pa), the gas pressure comparator 29 decides that the adjusted pressure in the gas supply equipment is abnormal, thus outputting a signal indicating the abnormality to the alarm generator 13.

Similarly, if the lowest pressure is less than the lower limit (3300 Pa), the gas pressure comparator 29 decides that the adjusted pressure in the gas supply equipment is abnormal, thus outputting a signal indicating the abnormality to the alarm generator 13.

In this manner, the gas pressure comparator decides whether or not the maximum pressure detected by the pressure sensor is greater than the standardized upper limit and the minimum pressure detected by the pressure sensor is smaller than the standardized lower limit. Accordingly, the pressure in the gas supply equipment can be inspected at an appropriate timing and thus, it is possible to detect an abnormality of the gas supply equipment with a high accuracy and reliability.

An abnormality detecting apparatus according to the sixth embodiment is described below with reference to FIGS. 19 through 21.

Figure 19:
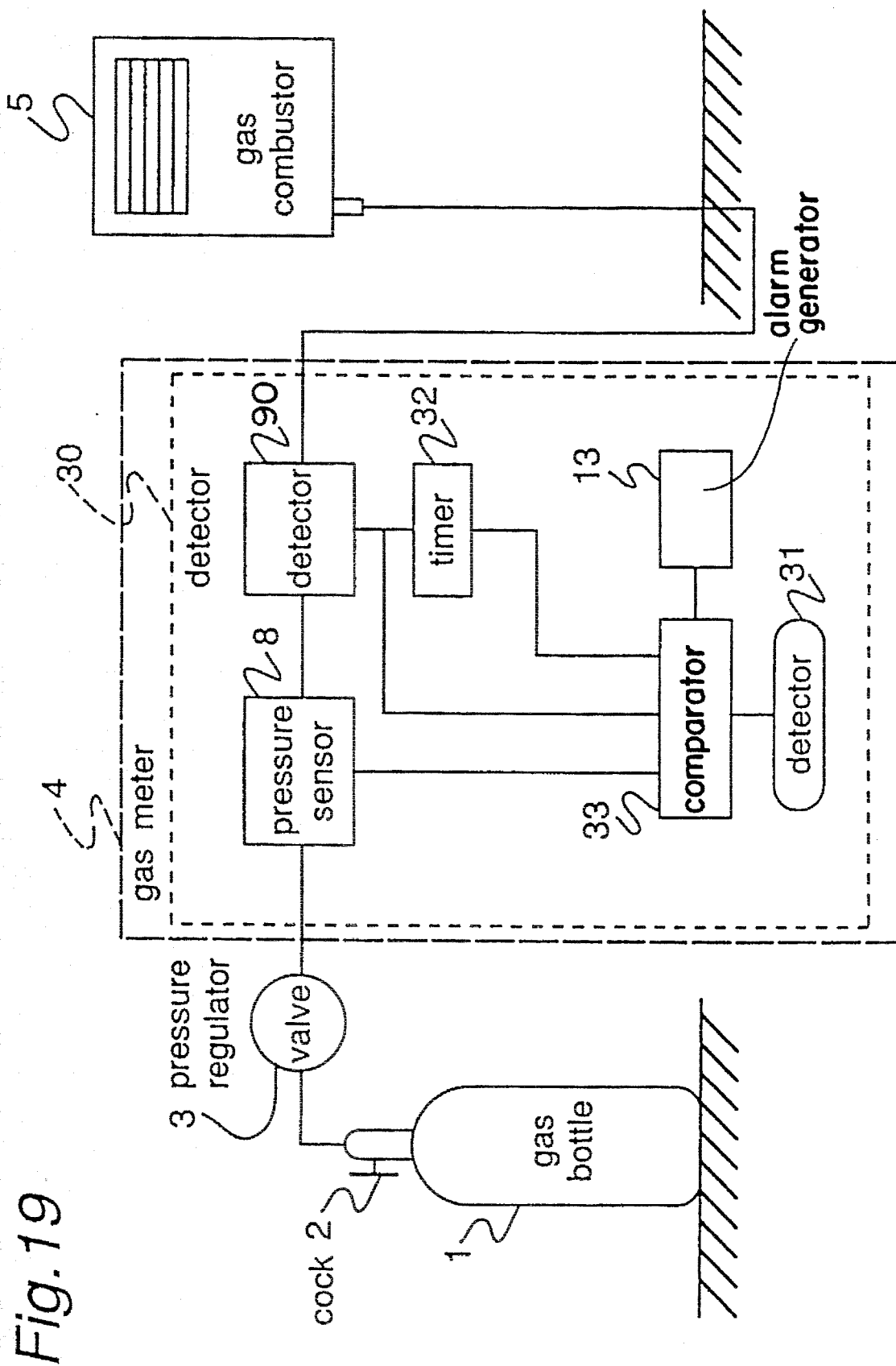
FIG. 19 is a control block diagram of a pressure abnormality monitoring apparatus according to a sixth embodiment of the present invention.

FIG. 19 is a block diagram showing an apparatus 30 according to the sixth embodiment. The apparatus 30 is incorporated in the gas meter 4.

The apparatus 30 comprises a temperature detector 31, comprising a thermistor, for example, for detecting a temperature correlative to the temperature of the gas; a fourth timer 32 for clocking a pressure measurement delay time corresponding to a temperature detected by the temperature detector 31 at the time of turn-on of the gas; and a gas pressure comparator 33 for comparing the value of a pressure signal detected by the pressure sensor 8 with a first pressure deciding value when the gas flow rate is at a maximum or comparing the value of the pressure signal detected by the pressure sensor 8 with a second pressure deciding value when the gas flow rate is at a minimum, from turn-on of the gas until a certain delayed time, proportional to a time period in which gas is cut off, counted by the fourth timer 32.

Figure 20:
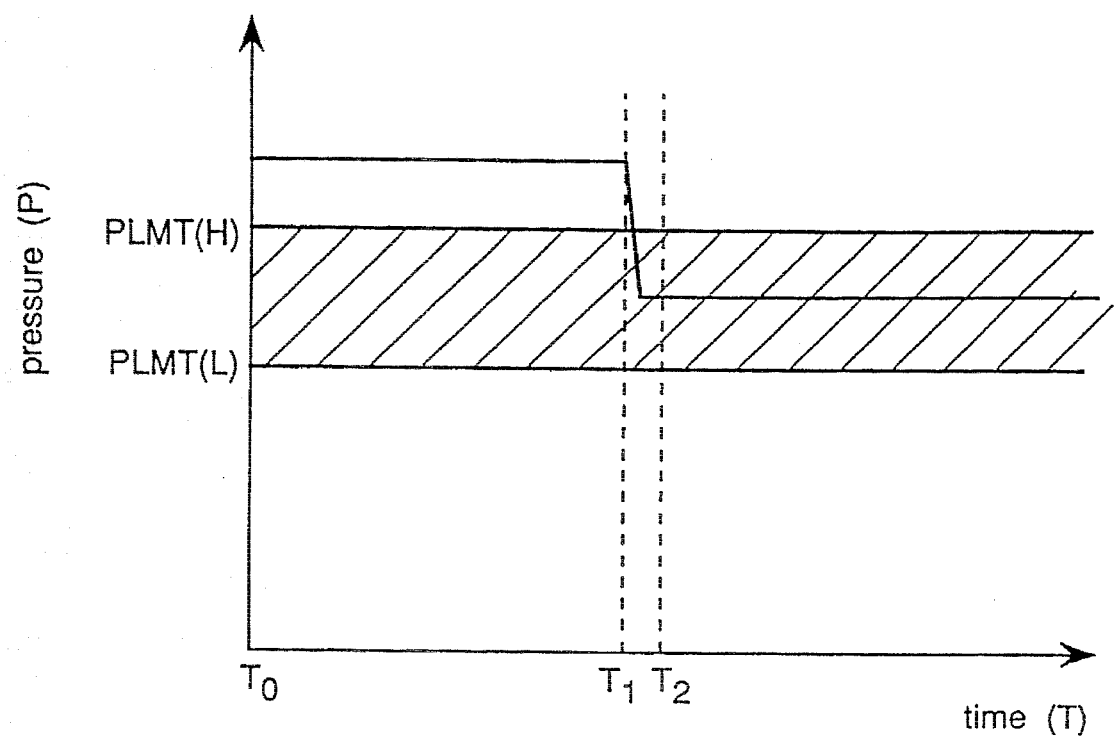
FIG. 20 is a view showing the change characteristic of pressure in normal condition in the pressure abnormality monitoring apparatus according to the fifth embodiment of the present invention.
Figure 21:
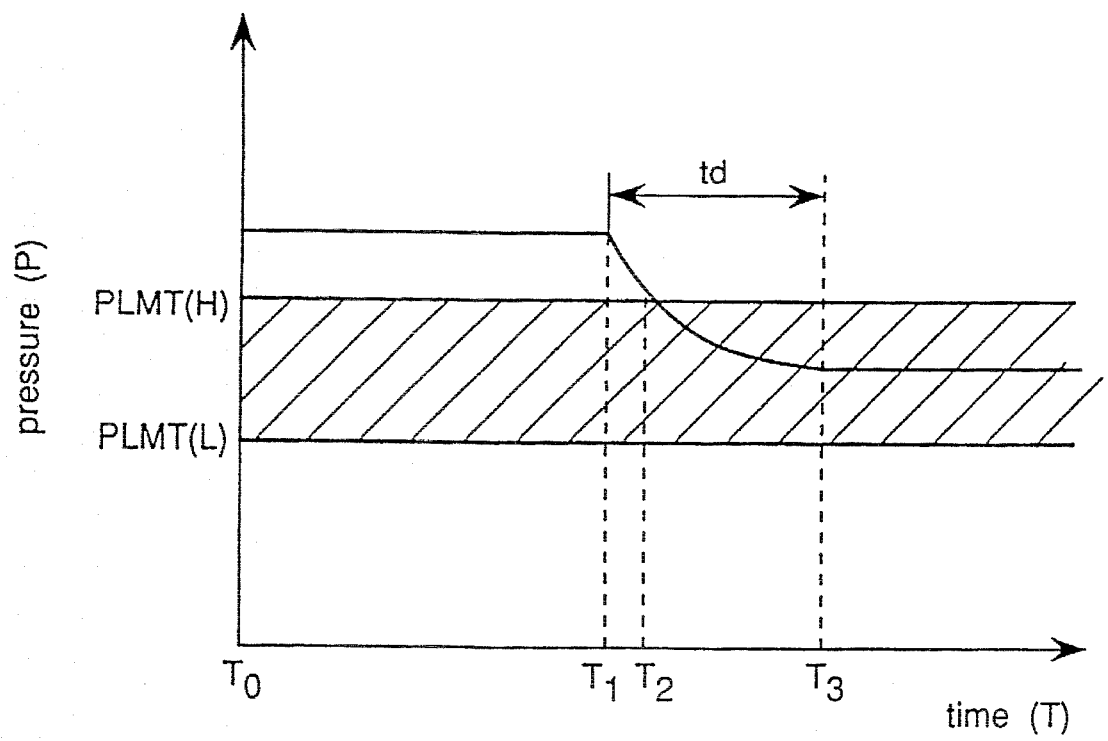
FIG. 21 is a view showing the change characteristic of pressure in the pressure abnormality monitoring apparatus according to the fifth embodiment of the present invention when the gas is liquefied.

FIGS. 20 and 21 show a pressure signal P outputted from the pressure sensor 8 at the turn-on of the gas. The pressure signal is an analog signal indicating a value proportional to a gas pressure.

FIG. 20 shows pressure signals detected by the pressure sensor 8 at turn-on of the gas in a normal time (when gas is intermittently used, i.e., when liquefied gas does not stay in a high pressure gas pipe between a gas bottle and a pressure regulator). FIG. 21 shows pressure signals detected by the pressure sensor 8 at turn-on of the gas when liquefied gas stays inside a high pressure gas pipe between the gas bottle 1 and the pressure regulator 3. Gas is liquefied when gas is not used for a long time or the temperature of the gas supply equipment fluctuates due to the change in outside temperature.

In FIGS. 20 and 21, in T=T0–T1, the gas is not used. At times after T1, the gas is used.

As shown in FIG. 20, at normal time, pressure becomes stabilized, one to two seconds after gas is turned on, in the pressure range (2300 Pa to 3300 Pa) of the pressure regulator.

As shown in FIG. 21, when gas in the gas pipe has been liquefied, gas pressure becomes stabilized in an appropriate range not immediately after the gas is turned on but in several seconds to more than 10 seconds after the gas is turned on. The reason is as follows: Gas inside the gas bottle 1 fed to the high pressure gas pipe between the gas bottle 1 and the pressure regulator 3 is liquefied if gas is not used for a long time or because the temperature of the gas supply equipment fluctuates due to the change in outside temperature. When the gas instrument is used with liquefied gas staying in the pipe, the liquefied gas is fed from the pressure regulator 3 while the liquefied gas is being vaporized. Thus, the adjusting function of the pressure regulator 3 does not operate accurately.

Inspection of pressure fluctuation turn-on of gas

Referring to FIGS. 20 and 21, at turn-on of the gas at T=T1, the flow rate detector 90 detects turn-on of the gas, thus outputting to the fourth timer 32 a clocking start signal for clocking measurement delay time (Td of FIG. 23) corresponding to a time required for pressureunstabilized state brought about by the liquefied gas to be overcome. The timing for the clocking start signal to be outputted to the fourth timer 32 is adjusted to a time corresponding to a temperature detected by the temperature detector 31, i.e., if gas is turned on when temperature is low, the clocking start signals are outputted to the fourth timer 32 at an interval of a long time (about 10 seconds); if gas is turned on when temperature is high, the clocking start signals are outputted to the fourth timer 32 at an interval of a short time (about 2 to 3 seconds). At the same time, the flow rate detector 90 outputs the flow rate signal to the gas pressure comparator 33 so as to inform it of turn-on of the gas. Upon receipt of a signal indicating a delay time in pressure measurement from the fourth timer 32, the gas pressure comparator 33 compares the value of a pressure signal outputted from the pressure sensor 8 with a predetermined adjusting pressure limit value (upper limit value 3300 Pa) as well as a predetermined adjusting pressure limit value (lower limit value 2300 Pa).

If the gas pressure comparator 33 detects predetermined times that the pressure signal outputted from the pressure sensor 8 is more than the predetermined upper limit adjusting pressure or less than the predetermined lower limit adjusting pressure, the gas pressure comparator 33 decides that the pressure in the pressure regulator 3 is abnormal, thus outputting a signal to the alarm generator 13.

As apparent from the above description, if an abnormal pressure is generated in the gas supply equipment at turn-on of the gas, it can be detected without an error, rapidly, and accurately.

Generally, a certain period of time is required to return a gas pressure at the time of turn-off of the gas to a gas pressure prior to turn-on of the gas. When the gas is used for a short period of time with liquefied gas staying in the gas pipe, the liquefied gas does not allow a pressure adjusting spring to operate appropriately. Thus, it takes a long time to return the gas pressure at the time of turn-off of the gas to the gas pressure before turn-on of the gas.

Accordingly, it is necessary to detect the gas pressure (cutoff pressure) when the gas pressure at the time of turn-off of the gas has changed to the gas pressure before use of the gas, measure the cutoff pressure at regular intervals based on the initial cutoff pressure so as to compare the initial cutoff pressure and each of the cutoff pressures with each other. That is, a delay time (Td of FIG. 23) including the duration of liquefied phenomenon which continues for a certain period of time is added to a signal detection delay time to set an actual delay time. In this manner, pressure fluctuation due to the increase in outside temperature after turn-off of the gas can be monitored with a high accuracy.

An abnormality detecting apparatus according to the seventh embodiment is described below with reference to FIGS. 22 through 24.

Figure 22:
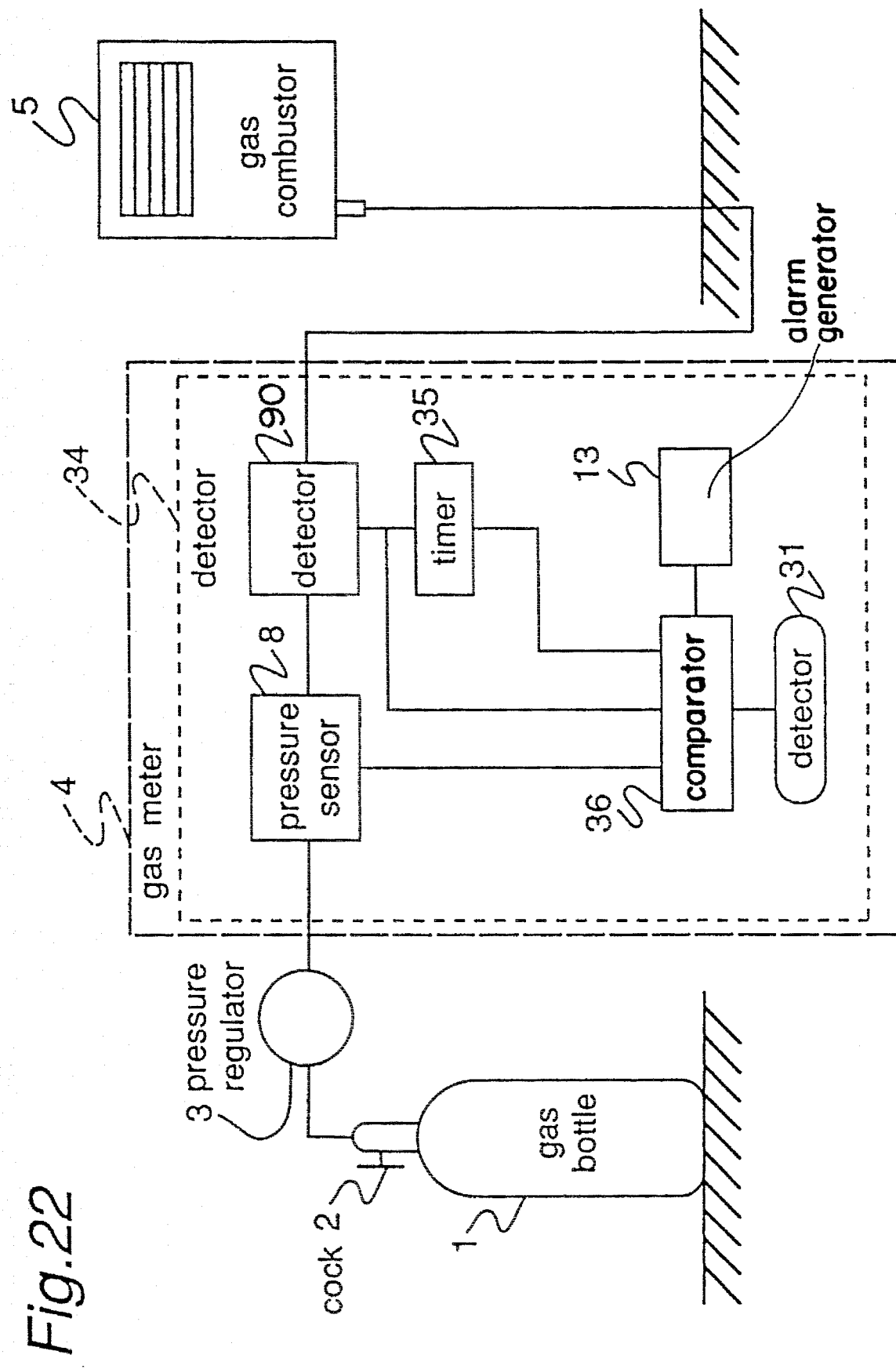
FIG. 22 is a control block diagram of a pressure abnormality monitoring apparatus according to a seventh embodiment of the present invention.

FIG. 22 is a block diagram showing an apparatus 34 according to the seventh embodiment. The apparatus 34 is incorporated in the gas meter 4.

The apparatus 34 comprises a fifth timer 35 for clocking pressure measurement delay time corresponding to the difference between a temperature detected by the temperature detector 31 at the time of turn-off of the gas and a temperature detected by the temperature detector 31 at the time of turn-on of the gas, and a gas pressure comparator 36 for comparing the value of a pressure signal detected by the pressure sensor 8 with a first pressure deciding value when the gas flow rate is at a maximum or comparing the value of the pressure signal detected by the pressure sensor 8 with a second pressure deciding value when the gas flow rate is at a minimum, from the initial use of the gas until a certain delayed time, proportional to a time period in which gas is cut off, counted by the fifth timer 35.

FIGS. 20 and 21 show a pressure signal P outputted from the pressure sensor 8 at the turn-on of the gas. The pressure signal is an analog signal indicating a value proportional to a gas pressure.

The operation of the apparatus 34 is described below.

Figure 23:
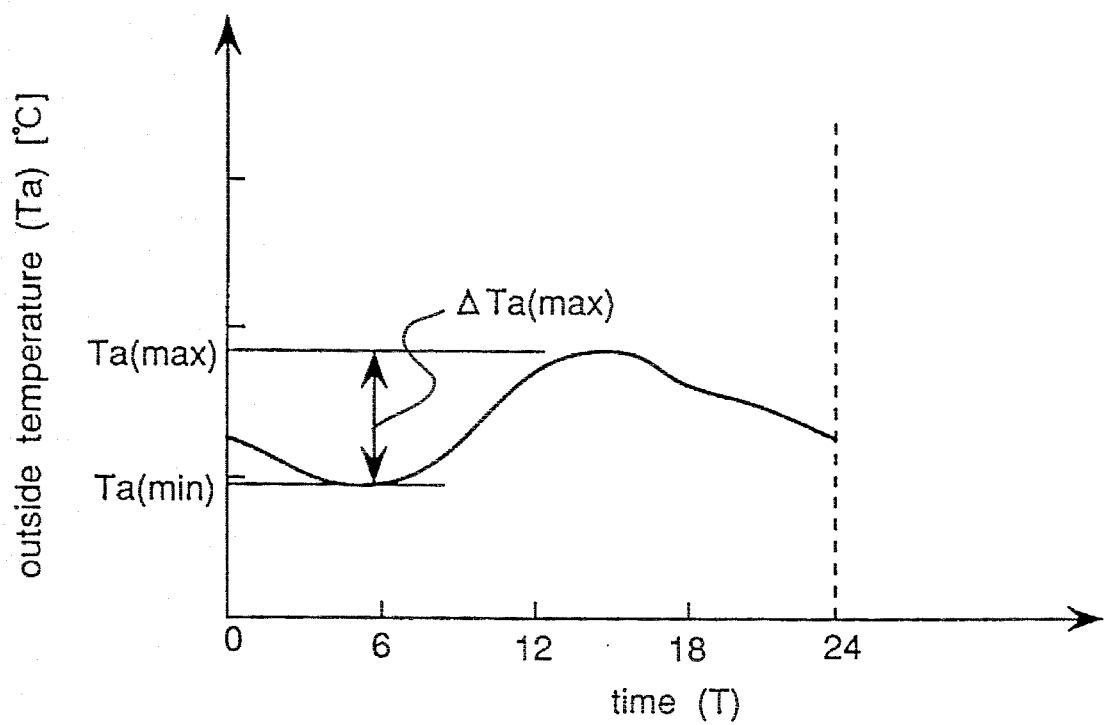
FIG. 23 is a view showing the relationship between each hour of a day and outside temperature.

FIG. 23 shows the relationship between outside temperature Ta and time T. Normally, the outside temperature Ta has a lowest temperature Ta (minimum) in early morning and a maximum temperature Ta (maximum) in the daytime.

Figure 24:
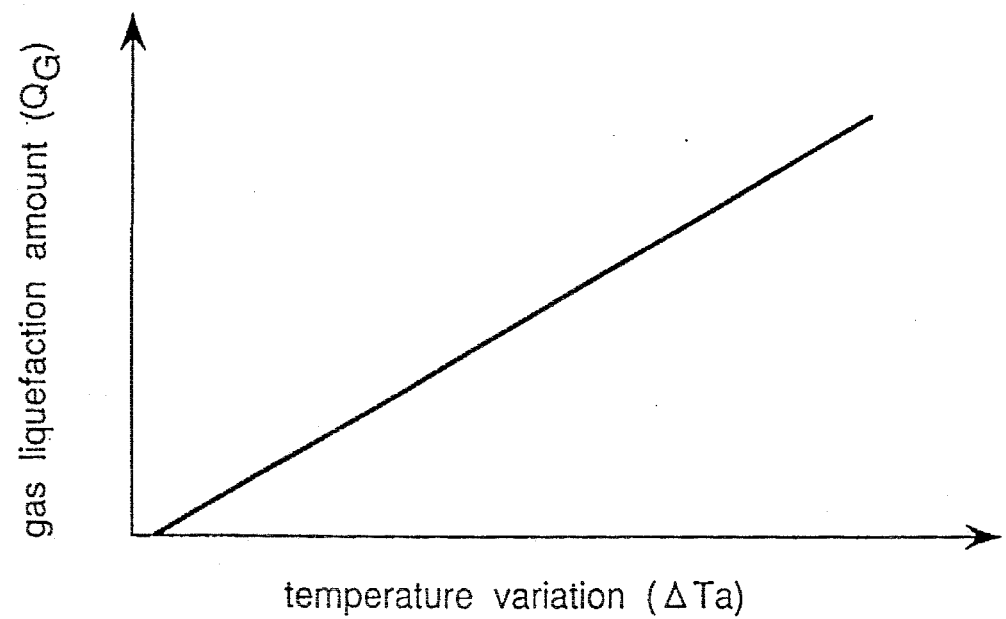
FIG. 24 is a view showing the relationship between temperature deviation ($\Delta Ta$) and gas-liquefied amount ($Q_G$) in the pressure abnormality monitoring apparatus.

Therefore, as shown in FIG. 24, the amount of liquefied gas QG in the high pressure gas pipe disposed between the gas bottle 1 and the pressure regulator 3 becomes maximum $\Delta Ta$ (max) when gas is not used from a time at which the maximum temperature is recorded until a time at which the minimum temperature is recorded and is proportional to the difference $\Delta Ta$ between a temperature detected at the time of turn-off of the gas and a temperature at the time of turn-on of the gas.

Accordingly, the period of time Td required for gas pressure to be stabilized after turn-on of the gas is determined proportionally to the temperature difference $\Delta Ta$.
Inspection of pressure fluctuation at the time of turn-on of gas At the time of turn-off of the gas, the gas pressure comparator 36 detects that flow rate pulse signals are not outputted from the flow rate detector 90, storing a temperature detected by the temperature detector 31. Then, at T=T1 of FIG. 21 at which the gas is turned on, the gas pressure comparator 36 receives the flow rate pulse signals from the flow rate detector 90, detects the turn-on of the gas, receives a temperature signal from the temperature detector 31, calculates the stored temperature difference $\Delta Ta$ between the temperature detected at the time of turn-off of the gas and the temperature at the time of turn-on of the gas, and sets a time at which pressure-unstabilized state proportional to the temperature difference $\Delta Ta$ to the fifth timer 35 as a measurement delay time (Td of FIG. 3). The fifth timer 35 counts the pressure measurement delay time proportional to a temperature difference set in the temperature detector 31. Upon receipt of the pressure measurement delay time signal from the fifth timer 35, the gas pressure comparator 36 starts comparing a pressure signal outputted from the pressure sensor 8 with the predetermined gas adjusting pressure (upper limit 3300 Pa) as well as the predetermined gas adjusting pressure (lower limit 2300 Pa).

If the gas pressure comparator 36 detects predetermined several times that the pressure signal outputted from the pressure sensor 8 is more than the predetermined upper limit adjusting pressure or less than the predetermined lower limit adjusting pressure, the gas pressure comparator 36 decides that the pressure in the pressure regulator 3 is abnormal, thus outputting a signal to the alarm giving generator 13.

As apparent from the above description, the amount of liquefied gas is estimated according to the temperature difference between a temperature detected at the time of turn-off of the gas and a temperature detected at the time of turn-on of the gas, and the gas pressure detector detects a pressure signal detected by the pressure sensor at a timing appropriate for avoiding the influence of a pressure fluctuation of gas at the time of turn-on of the gas in a short period of time. In this manner, a gas pressure during use of the gas can be detected without an error, promptly, and accurately.

Further, a gas cutoff pressure generated after turnoff of the gas is monitored to detect the gas cutoff pressure which has risen due to the rise in outside temperature and sunshine. Therefore, the apparatus according to the seventh embodiment operates in a manner similar to the sixth embodiment when it is applied to an apparatus, for monitoring fluctuation in cutoff pressure, which is used to detect and decide whether or not gas has leaked from a gas pipe or whether or not a pressure adjusting device has an abnormal pressure. Further, needless to say, fluctuation in cutoff pressure in the apparatus can be monitored accurately even though outside temperature rises after turn-off of the gas.

In the seventh embodiment, delay time Td in pressure measurement is found by calculation because delay time Td is proportional to the temperature difference $\Delta Ta$. But it is possible to perform additions or subtractions of correcting times or observe pressure signals at the time of turn-on of the gas to appropriately alter the delay time Td in pressure measurement.

As apparent from the foregoing description, the following effects can be obtained by the abnormality detecting apparatus according to the present invention:

(1) Even though the cutoff pressure is decided as abnormal, the gas pressure comparator means is operated in correspondence with a signal outputted from the first timer so that the gas pressure comparator means compares a signal outputted from the pressure sensor with the pressure held in the cutoff pressure memory. Accordingly, gas leakage which has occurred upstream of the gas meter can be detected separately from an abnormality of the pressure regulator.

(2) The cutoff pressure at the time of nonuse of the gas instrument is correctly measured in consideration of the consumption amount of the gas instrument and the operation characteristic of the pressure regulator. In addition, the fluctuation amount of the cutoff pressure of gas is monitored until the next use of the gas instrument. In this manner, both gas leakage from the gas pipe during nonuse of the gas instrument and the abnormality of the pressure regulator can be detected.

(3) Even though a very high initial cutoff pressure is detected at the time of nonuse of the gas due to nonuniform characteristic of the cutoff pressure, the cutoff pressure reference value is updated. Therefore, it can be reliably detected whether or not gas pressure has risen owing to the temperature rise of gas inside the gas supply equipment caused by the rise of outside temperature and sunshine. Thus, the abnormality (gas leakage and failure of the pressure regulator) of the gas supply equipment can be reliably monitored.

(4) The gas pressure comparator means decides whether or not the maximum pressure detected by the pressure sensor is greater than the standardized upper limit and the minimum pressure detected by the pressure sensor is smaller than the standardized lower limit. Accordingly, the pressure in the gas supply equipment can be inspected at an appropriate timing and thus, it is possible to detect an abnormality of the gas supply equipment with a high accuracy and reliability.

(5) In order to overcome of the generation of liquefied gas in the gas pipe liquified due to the pressure fluctuation, the gas pressure detector detects a pressure signal detected by the pressure sensor at a timing appropriate for avoiding the influence of a pressure fluctuation of gas during use of the gas instrument. In this manner, a gas pressure can be detected without an error, promptly, and accurately after the gas is turned on. That is, the abnormality of the pressure regulator can be inspected promptly and accurately.

(6) The amount of liquefied gas is estimated according to the temperature difference between a temperature detected at the time of turn-off of the gas and a temperature detected at the time of turn-on of the gas, and the gas pressure detector detects a pressure signal detected by the pressure sensor at a timing appropriate for avoiding the influence of a pressure fluctuation of gas at the time of turn-on of the gas in a short period of time. In this manner, a gas pressure during use of the gas can be detected without an error, promptly, and accurately. That is, the abnormality of the pressure regulator can be inspected promptly and accurately.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An abnormality detecting apparatus comprising:

a pressure sensor, disposed downstream of a gas pressure regulator, for detecting a gas pressure of a gas supply equipment;

a flow rate detector, said flow rate detector detecting a flow rate of gas flowing through the gas supply equipment;

a first timer which operates on receipt of a signal outputted from the flow rate detector when the gas is turned off;

a cutoff pressure memory, said cutoff pressure memory storing a signal outputted from the pressure sensor;

a cutoff pressure normality/abnormality deciding unit, said deciding unit comparing a pressure stored in the cutoff pressure memory with a predetermined first pressure based on a signal outputted from the first timer;

a gas pressure comparator, said gas pressure comparator comparing the value of a signal outputted from the pressure sensor with a cutoff pressure reference value stored on said cutoff pressure memory based on a signal outputted from the first timer if the cutoff pressure normality/abnormality deciding unit decides that a cutoff pressure is abnormal; and an alarm generator, said alarm generator outputting a signal indicating abnormality alarm, abnormality information, abnormality indication, and/or cutoff of a gas passage on receipt of a signal outputted from the gas pressure comparator.

2. An abnormality detecting apparatus as defined in claim 1, further comprising: a measuring time memory, said measuring time memory storing a measurement delay time of cutoff pressure at the time of turn-off of gas in accordance with the difference between a gas pressure detected before turn-on of gas and a gas pressure during the use of gas; and a second timer, said second timer outputting a signal indicating a delay time in pressure measurement to the cutoff pressure memory on receipt of a signal, indicating a delay time in pressure measurement, outputting from the measuring time memory, when said second timer has counted the delay time in pressure measurement.

3. An abnormality detecting apparatus as defined in claim 1, further comprising: a third timer, said third timer outputting clock signals at first predetermined intervals after the gas is turned off; and a first cutoff pressure reference value renewal unit, said first renewal unit updating a cutoff pressure on receipt of a clock signal outputted from the third timer, thus outputting a signal to the cutoff pressure memory so that the cutoff pressure memory stores an updated cutoff pressure reference value.

4. An abnormality detecting apparatus as defined in claim 1, further comprising: a comparator, said comparator comparing a pressure signal outputted from the pressure sensor with a cutoff pressure reference value outputted from the cutoff pressure memory, thus outputting a signal indicating the difference therebetween; and a second cutoff pressure reference value renewal unit, said second renewal unit updating a cutoff pressure reference value on receipt of a clock signal outputted from the comparator, thus outputting a signal indicting an updated cutoff pressure reference value to the cutoff pressure memory when a pressure signal outputted from the pressure sensor is lower than the cutoff pressure reference value stored in the cutoff pressure memory so that the cutoff pressure memory stores the updated cutoff pressure reference value.

5. An abnormality detecting apparatus comprising:

a pressure sensor, disposed downstream of a gas pressure regulator, for detecting a gas pressure of a gas supply equipment;

a flow rate detector, said flow rate detector detecting a flow rate of gas flowing through the gas supply equipment;

a comparator said comparator comparing pressure values from the pressure sensor, which are detected when the flow rate of gas is at a maximum and at a minimum, with predetermined first and second pressure values respectively, and determining an abnormality of gas supply equipment, wherein said second predetermined value is greater than said first predetermined value; and an alarm signal generator, said generator outputting at least one abnormal signal of alarm, abnormality information, abnormality display and cut off of the gas flow, when the gas supply equipment has an abnormality.

6. An abnormality detecting apparatus comprising:

a pressure sensor, disposed downstream of a gas pressure regulator, for detecting a gas pressure of a gas supply equipment;

a flow rate detector, said flow rate detector detecting a flow rate of gas flowing through the gas supply equipment;

a comparator, said comparator comparing pressure values from the pressure sensor, which are detected when the flow rate of gas is at a maximum and at a minimum, with predetermined first and second pressure values respectively, and determining an abnormality of gas Supply equipment;

an alarm signal generator, said generator outputting at least one abnormal signal of alarm, abnormality information, abnormality display and cut off of the gas flow, when the gas supply equipment has an abnormality;

a temperature detector, said temperature detector detecting a temperature correlative to the temperature of gas;

a fourth timer, said fourth timer clocking a pressure measurement delay time corresponding to a temperature detected by the temperature detector at the time of turn-on of the gas; and a gas pressure comparator, said gas pressure comparator comparing the value of a pressure signal detected by the pressure sensor with a first pressure deciding value when the gas flow rate is at a maximum or comparing the value of the pressure signal detected by the pressure sensor with a second pressure deciding value when the gas flow rate is at a minimum, from turn-on of the gas until a certain delayed time, proportional to a time period in which gas is cut off, counted by the fourth timer, thereby determining whether or not the gas supply equipment has an abnormality.

7. An abnormality detecting apparatus comprising:

a pressure sensor, disposed downstream Of a gas pressure regulator, for detecting a gas pressure of a gas supply equipment;

a flow rate detector, said flow rate detector detecting a flow rate of gas flowing through the gas supply equipment;

a comparator, said comparator comparing pressure values from the pressure sensor, which are detected when the flow rate of gas is at a maximum and at a minimum, with predetermined first and second pressure values respectively, and determining an abnormality of gas. Supply equipment;

an alarm signal generator, said generator outputting at least one abnormal signal of alarm, abnormality information, abnormality display and cut off of the gas flow, when the gas supply equipment has an abnormality;

a temperature detector, said temperature detector detecting a temperature correlative to the temperature of gas;

a fifth timer, said fifth timer clocking pressure measurement delay time corresponding to the difference between a temperature detected by the temperature detector at the time of turn-off of the gas and a temperature detected by the temperature detector at the time of turn-on of the gas; and a gas pressure comparator, said gas pressure comparator comparing the value of a pressure signal detected by the pressure sensor with a first pressure deciding value when the gas flow rate is at a maximum or comparing the value of the pressure signal detected by the pressure sensor with a second pressure deciding value when the gas flow rate is at a minimum, from the initial use of the gas until a certain delayed time, proportional to a time period in which gas is cut off, counted by the firth timer, thereby determining whether or not the gas supply equipment has an abnormality.

8. A method for detecting abnormality in a gas supply equipment by using an abnormality detecting apparatus comprising: a pressure sensor, disposed downstream of a gas pressure regulator, for detecting a gas pressure of a gas supply equipment; a flow rate detector for detecting a flow rate of gas flowing through the gas supply equipment; a first timer, said first timer operating on receipt of a signal outputted from the flow rate detector when the gas is turned off; a cutoff pressure memory, said cutoff pressure memory storing a signal outputted from the pressure sensor at a time when a gas instrument is not used; a gas pressure comparator, said gas pressure comparator comparing the value of a signal outputted from the pressure sensor with a cutoff pressure reference value stored in the cutoff pressure memory, based on a signal outputted from the first timer if a cutoff pressure normality/abnormality deciding unit determining that a cutoff pressure is abnormal; and an alarm generator, said alarm generator outputting a signal indicating an abnormality alarm, abnormality information, abnormality indication, and/or cutoff of a gas passage on receipt of a signal outputted from the gas pressure comparator, the method comprising the steps of:

deciding the flow rate of gas based on an output of the flow rate detector;

comparing the value of a pressure signal outputted from the pressure sensor at the time of turn-off of the gas with a first pressure on the receipt of a signal outputted from the flow rate detector, thus deciding that a cutoff pressure is abnormal if the value of the pressure signal outputted from the pressure sensor is greater than the first pressure and outputting a signal indicating an abnormal cutoff pressure to the alarm generator; and comparing the value of the pressure signal detected by the pressure sensor, which has increased by the passage of time, with a predetermined deciding value when it is decided that the cutoff pressure is abnormal, assuming that the gas remains turned off, thereby deciding that gas has leaked from the gas supply equipment if a state in which the gas pressure does not exceed the predetermined deciding value and outputting a signal to the alarm generator.

* * * * *